US012655041B2

(12) United States Patent (10) Patent No.: US 12,655,041 B2
Nakata et al. (45) Date of Patent: Jun. 16, 2026

(54) METHOD FOR OPERATING REVERSE OSMOSIS MEMBRANE DEVICE, A SLIME CONTROL METHOD, AND A WATER TREATMENT DEVICE

(71) Applicant: KURITA WATER INDUSTRIES LTD., Tokyo (JP)

(72) Inventors: Koji Nakata, Tokyo (JP); Junichi Takahashi, Tokyo (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 349 days.

(21) Appl. No.: 18/273,027

(22) PCT Filed: Feb. 24, 2022

(86) PCT No.: PCT/JP2022/007588

§ 371 (c)(1),
(2) Date: Jul. 18, 2023

(87) PCT Pub. No.: WO2022/209461

PCT Pub. Date: Oct. 6, 2022

(65) Prior Publication Data

US 2024/0083779 A1 Mar. 14, 2024

(30) Foreign Application Priority Data

Mar. 29, 2021 (JP) ................................ 2021-055489

(51) Int. Cl.
*C02F 1/50* (2023.01)
*B01D 65/08* (2006.01)
*C02F 1/44* (2023.01)
(52) U.S. Cl.
CPC .............. *C02F 1/441* (2013.01); *B01D 65/08* (2013.01); *C02F 1/50* (2013.01);
(Continued)

(58) Field of Classification Search
CPC ........ C02F 1/441; C02F 1/50; C02F 2303/20; C02F 2305/02; C02F 1/76;
(Continued)

(56) References Cited

U.S. PATENT DOCUMENTS

2012/0145630 A1* 6/2012 Ogiwara .............. B01D 61/029
210/638
2013/0026097 A1 1/2013 Hirao et al.
(Continued)

FOREIGN PATENT DOCUMENTS

CL 2014000022 6/2014
CN 104812705 7/2015
(Continued)

OTHER PUBLICATIONS

English translation of publication WO_2020040251_A1, Feb. 27, 2020. (Year: 2020).*
(Continued)

*Primary Examiner* — Joseph W Drodge
(74) *Attorney, Agent, or Firm* — JCIPRNET

(57) ABSTRACT

A method for operating a reverse osmosis membrane device, a slime control method that is applied to a reverse osmosis membrane device, and a water treatment device are provided. The method comprises: a first step for intermittently adding an oxidation-based slime inhibitor and intermittently supplying water to be treated containing the oxidation-based slime inhibitor to a reverse osmosis membrane device; and a second step for adding an organic-based slime inhibitor at least during a period other than the addition period of the first step and supplying the water to be treated containing the organic-based slime inhibitor to the reverse osmosis membrane device.

4 Claims, 3 Drawing Sheets

(52) U.S. Cl.
CPC .. *B01D 2321/167* (2022.08); *B01D 2321/168* (2013.01); *C02F 2303/20* (2013.01); *C02F 2305/02* (2013.01)

(58) Field of Classification Search
CPC .............. B01D 2321/167; B01D 65/08; B01D 2311/12; B01D 61/025; B01D 61/04; B01D 65/06; B01D 65/02; B01D 65/022; B01D 2321/16; B01D 2321/168; Y02A 20/131
See application file for complete search history.

(56) References Cited

U.S. PATENT DOCUMENTS

| | | | | |
|---|---|---|---|---|
| 2014/0124442 | A1 | 5/2014 | Nakamura et al. | |
| 2016/0354725 | A1* | 12/2016 | Kakigami | B01D 63/107 |
| 2017/0044029 | A1* | 2/2017 | Nakano | B01D 61/025 |
| 2017/0266618 | A1* | 9/2017 | Taniguchi | B01D 61/58 |
| 2019/0059380 | A1 | 2/2019 | Iyasu et al. | |
| 2021/0170341 | A1 | 6/2021 | Endo | |

FOREIGN PATENT DOCUMENTS

| | | |
|---|---|---|
| CN | 111925010 | 11/2020 |
| EP | 3950602 | 2/2022 |
| JP | 2009247992 | 10/2009 |
| JP | 5581312 | 8/2014 |
| JP | 2017088534 | 5/2017 |
| JP | 2018114473 | 7/2018 |
| JP | 2020028865 | 2/2020 |
| JP | 2020054969 | 4/2020 |
| JP | 2020163271 | 10/2020 |
| TW | 201834737 | 10/2018 |

| | | | |
|---|---|---|---|
| WO | 2011125762 | 10/2011 | |
| WO | 2016158633 | 10/2016 | |
| WO | WO-2020040251 A1 * | 2/2020 | ............. A01N 59/08 |

OTHER PUBLICATIONS

"Office Action of Japan Counterpart Application" with English translation thereof, issued on Apr. 19, 2022, p. 1-p. 12.
"Office Action of Japan Counterpart Application" with English translation thereof, issued on Oct. 11, 2022, p. 1-p. 16.
J. S. Vrouwenvelder et al., "Biofouling of Spiral Wound Membrane Systems," IWA Publishing, Mar. 15, 2011, pp. 47-71.
"International Search Report (Form PCT/ISA/210) of PCT/JP2022/007588", mailed on Apr. 26, 2022, with English translation thereof, pp. 1-4.
"Written Opinion of the International Searching Authority (Form/ISA/237) of PCT/JP2022/007588", mailed on Apr. 26, 2022, with English translation thereof, pp. 1-9.
"Search Report of Europe Counterpart Application", issued on Mar. 3, 2025, pp. 1-8.
"Office Action of Korea Counterpart Application", issued on Mar. 7, 2025, with English translation thereof, pp. 1-13.
"Office Action of Chile Counterpart Application", issued on Jul. 4, 2024, with English translation thereof, pp. 1-30.
Japanese Industrial Standards Committee, "JIS Membrane terminology", Aug. 2015, submit with English translation, pp. 1-7.
"Office Action of China Counterpart Application", issued on Jun. 29, 2025, with English translation thereof, pp. 1-18.
"Office Action of Taiwan Counterpart Application", issued on Aug. 6, 2025, with English translation thereof, pp. 1-16.
"Office Action of Chile Counterpart Application", issued on Dec. 12, 2024, with English translation thereof, pp. 1-34.
"Office Action of Japan Counterpart Application", issued on Dec. 24, 2024, with English translation thereof, pp. 1-7.
"Patent Refusal Decision of Taiwan Counterpart Application", issued on Oct. 21, 2025, with English translation thereof, p. 1-p. 5.

* cited by examiner

METHOD FOR OPERATING REVERSE OSMOSIS MEMBRANE DEVICE, A SLIME CONTROL METHOD, AND A WATER TREATMENT DEVICE

CROSS-REFERENCE TO RELATED APPLICATION

This application is a 371 application of the International PCT application serial no. PCT/JP2022/007588, filed on Feb. 24, 2022, which claims the priority benefits of Japan Patent Application No. 2021-055489, filed on Mar. 29, 2021. The entirety of each of the above-mentioned patent applications is hereby incorporated by reference herein and made a part of this specification.

TECHNICAL FIELD

The present invention relates to a method for operating a reverse osmosis membrane device, a slime control method that is applied to a reverse osmosis membrane device and a water treatment device with which the methods are performed.

BACKGROUND ART

Conventionally, reverse osmosis membranes (RO membranes) provided in reverse osmosis membrane devices are used to remove ions, organic substances or the like in raw water in seawater desalination, ultrapure water production, industrial water treatments, wastewater recovery treatments, reuse of wastewater and the like. In water systems having a reverse osmosis membrane device, there has been a problem in that microorganisms such as bacteria or microalgae that are contained in water to be treated turn into slime (biofilm) by the secretion or the like of an extracellular substance (for example, extracellular polysaccharide or the like), this slime is attached to and accumulated in a reverse osmosis membrane during water supply, and the microorganisms that are contained in the slime attached to the reverse osmosis membrane make the amount of the slime further increase or the like, which causes biofouling (the clogging or the like of the membrane by the slime or the like).

Conventionally, as a method for removing slime attached to and cultivated on the surface of a reverse osmosis membrane, a method in which the operation of a reverse osmosis membrane device is stopped, the reverse osmosis membrane is washed with a chemical such as caustic soda, and the slime is removed has been performed. However, in such a method, the continuous operation of the reverse osmosis membrane device was hindered, and an increase in the running cost was caused.

In recent years, a method in which the operation of a reverse osmosis membrane device is not stopped, a slime inhibitor is injected into a water system that supplies water to the reverse osmosis membrane device, and slime (biofilm) attached to the surface of a reverse osmosis membrane is removed has been performed. In such a method, a variety of kinds of compounds have been studied as slime inhibitors, and a number of slime inhibition methods where this slime inhibitor is used have been proposed.

For example, Patent Literature 1 discloses a pure water production method including a slime control agent addition step for adding a slime control agent to raw water, a membrane treatment step for performing a membrane treatment on the slime control agent-containing raw water to which the slime control agent has been added, an ultraviolet irradiation treatment step for treating a membrane-treated water on which the membrane treatment has been performed by irradiation with ultraviolet rays and an ion-exchange treatment step for performing an ion-exchange treatment on an ultraviolet irradiation-treated liquid on which the ultraviolet irradiation treatment has been performed.

In addition, Patent Literature 2 discloses that a slime inhibition method in a reverse osmosis membrane device is a slime inhibition method that is applied to a water-passing step of water to be treated and includes a first water-passing step for adding a slime inhibitor X containing 2,2-dibromo-3-nitrilopropionamide (DBNPA) and a slime inhibitor Y containing at least one selected from the group consisting of the following components (A) to (D) to water to be treated having a pH adjusted to 10 or lower and passing this water to be treated through a reverse osmosis membrane.

CITATION LIST

Patent Literature

[Patent Literature 1]
    Japanese Patent Laid-Open No. 2009-247992
[Patent Literature 2]
    Japanese Patent Laid-Open No. 2020-28865
[Patent Literature 3]
    WO 2011/125762

Non-Patent Literature

[Non-Patent Literature 1]
    J. S. Vrouwenvelder et. al., "Biofouling of Spiral Wound Membrane Systems" IWA Publishing (2011)

SUMMARY OF INVENTION

Technical Problem

Usually, when a water system is continuously operated for a long period of time, slime that is generated in the water system is attached to a reverse osmosis membrane provided in a reverse osmosis membrane device or a microorganism attached to the reverse osmosis membrane further increases slime, and thus there are cases where the operation of the reverse osmosis membrane device is stopped for the membrane exchange, washing or the like of the reverse osmosis membrane device. However, the readjustment of the device at the time of reoperation after the stoppage of the reverse osmosis membrane device or an increase in the number of times of the membrane exchange, washing or the like of the reverse osmosis membrane device leads to an increase in the running cost. Therefore, the present inventors decided to study long-term operation by ensuring the number of days until occlusion as many as possible so as to prevent the operation of the reverse osmosis membrane device from being stopped as much as possible.

That is, a main objective of the present invention is to provide a technique with which a water system having a reverse osmosis membrane device can be operated over a longer period of time.

Solution to Problem

As a result of intensive studies, the present inventors found that, in a water system having a reverse osmosis membrane device, when a first step for intermittently adding an oxidation-based slime inhibitor to water to be treated and a second step for adding an organic-based slime inhibitor to the water to be treated are controlled and operated in combination, it is possible to operate the water system having a reverse osmosis membrane device over a longer period of time. The present inventors found that, at this time, it is possible to reduce slime that is present in a reverse osmosis membrane of a reverse osmosis membrane device or inhibit an increase in the slime more favorably, whereby biofouling can be more favorably inhibited. In addition, the present inventors completed the present invention as described below.

The present invention provides a method for operating a reverse osmosis membrane device, the method having a first step for intermittently adding an oxidation-based slime inhibitor and intermittently supplying water to be treated containing the oxidation-based slime inhibitor to a reverse osmosis membrane device and a second step for adding an organic-based slime inhibitor "at least during a period other than the addition period of the first step" and supplying the water to be treated containing the organic-based slime inhibitor to the reverse osmosis membrane device. "At least" in "at least during a period other than the addition period of the first step" means that the organic-based slime inhibitor is added at least "during the entire period or partial period of the period other than the addition period of the first step" between "the addition period of the first step (first intermittent addition period)" and "the period other than the addition period of the first step (first addition-free period)", and the organic-based slime inhibitor may be added during both periods of the first addition-free period and the first intermittent addition period or may be added only during a period of the first addition-free period (as an example, refer to FIG. 1 and FIG. 2).

The present invention provides a slime control method that is applied to a reverse osmosis membrane device, the method having a first step for intermittently adding an oxidation-based slime inhibitor and intermittently supplying water to be treated containing the oxidation-based slime inhibitor to a reverse osmosis membrane device and a second step for adding an organic-based slime inhibitor at least during the period other than the addition period of the first step and supplying the water to be treated containing the organic-based slime inhibitor to the reverse osmosis membrane device.

The present invention provides a water treatment device with which the method for operating a reverse osmosis membrane device or the slime control method that is applied to a reverse osmosis membrane device are performed.

An addition concentration of the oxidation-based slime inhibitor may be adjusted to be higher than an addition concentration of the organic-based slime inhibitor.

The oxidation-based slime inhibitor may be added once or more during three days of an operation period.

The oxidation-based slime inhibitor may be added for 10 minutes or longer per addition.

0.1 mg/L or more of the oxidation-based slime inhibitor may be added in terms of a total chlorine concentration.

0.01 mg/L or more of the organic-based slime inhibitor may be added.

Advantageous Effects of Invention

According to the present invention, it is possible to provide a technique with which a water system having a reverse osmosis membrane device can be operated over a longer period of time. The effect of the present invention is not necessarily limited to the effect described herein and may be any effect described in the present specification.

DESCRIPTION OF EMBODIMENTS

Figure 1:
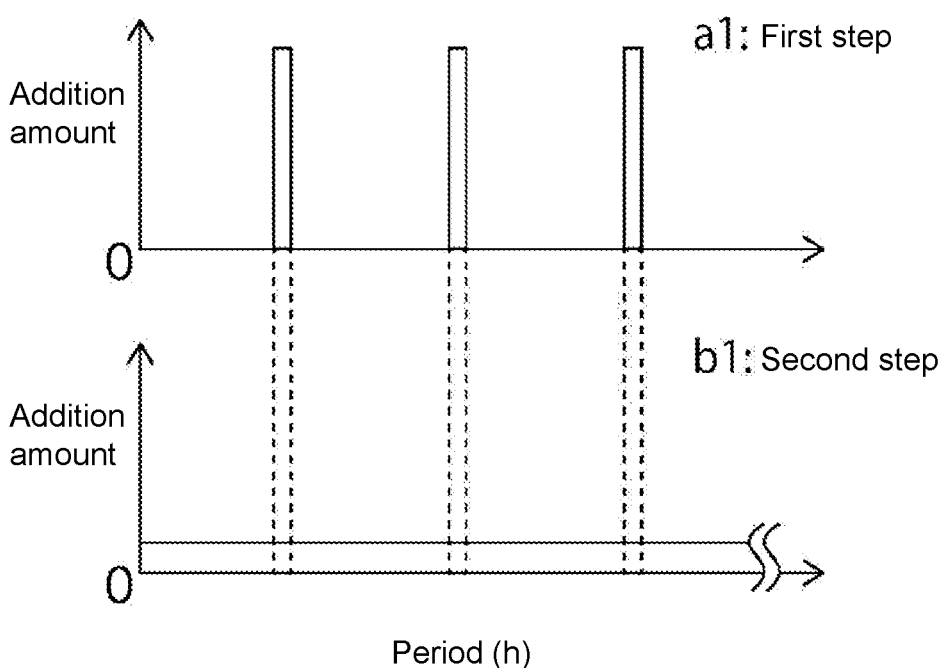
FIG. 1 is a schematic view showing an example of the controls of a first addition step and a second addition step according to an embodiment of the present invention. a1: In the first addition step, an oxidation-based slime inhibitor is intermittently added at equal intervals. b1: In the second addition step, an organic-based slime inhibitor is added at all times. At this time, the organic-based slime inhibitor is added at least during a period other than an addition period of the first addition step. The horizontal axis is the operation period (hours), and the vertical axis is the addition amount.

Hereinafter, an embodiment for carrying out the present invention will be described. The embodiment to be described below shows an example of a typical embodiment of the present invention and should not be interpreted to limit the scope of the present invention. The upper limit values and lower limit values of numerical values can be arbitrarily combined as desired.

1. Method for Operating Reverse Osmosis Membrane Device According to Present Embodiment The present invention is capable of providing a method for operating a reverse osmosis membrane device, the method having a first step for intermittently adding an oxidation-based slime inhibitor and intermittently supplying water to be treated containing the oxidation-based slime inhibitor to a reverse osmosis membrane device and a second step for adding an organic-based slime inhibitor at least during a period other than the addition period of the first step and supplying the water to be treated containing the organic-based slime inhibitor to the reverse osmosis membrane device.

The slime inhibitor that is used in the present specification refers to a chemical capable of inhibiting an increase in slime and may include a chemical capable of reducing or removing slime present in a membrane, a chemical capable of killing microorganisms (a bactericide, an algicide or the like) and a chemical capable of inhibiting the cultivation of microorganisms (an antimicrobial or the like). In addition, in the present specification, ordinal numbers "first" and "second" in the first step, the second step and the like are attached for the convenience of description, and the attachment of "first" and "second" does not limit the present embodiment in a narrow sense and being particularly limited.

The oxidation-based slime inhibitor that is used in the present embodiment is a component or chemical capable of at least inhibiting slime derived from a microorganism (for example, bacteria, fungi, microalgae or the like) in a redox reaction or a chemical containing the above-described component or chemical as an active ingredient and can be detected by a DPD method. However, in the present specification, a halocyanoacetamide compound (preferably DBNP) has an enzyme metabolism function inhibitory action and is thus classified into an organic-based slime inhibitor.

The organic-based slime inhibitor that is used in the present embodiment is a component or chemical capable of at least inhibiting slime derived from a microorganism (for example, bacteria, fungi, microalgae or the like) by hindering the metabolism function of a microorganism (enzyme or the like) or a biological function or the like by a reaction with a cell (for example, a SH group) of a microorganism or a chemical containing the above-described component or chemical as an active ingredient.

1-1. First Step where Oxidation-Based Slime Inhibitor is Used

The first step is preferably a step for intermittently adding an oxidation-based slime inhibitor and intermittently supplying water to be treated containing the oxidation-based slime inhibitor to a reverse osmosis membrane device.

Furthermore, the first step preferably has a first addition step for intermittently adding an oxidation-based slime inhibitor to water to be treated and a first supply step for intermittently supplying the water to be treated containing the oxidation-based slime inhibitor after the addition to a reverse osmosis membrane device.

1-1-1. First Addition Step

The first step is a step for intermittently adding an oxidation-based slime inhibitor to water to be treated. This makes it possible to obtain water to be treated containing the oxidation-based slime inhibitor and makes it possible to intermittently supply the water to be treated containing the oxidation-based slime inhibitor after the addition to a reverse osmosis membrane device (for example, refer to FIG. 1 and FIG. 2).

In the first addition step, it is preferable that the oxidation-based slime inhibitor is intermittently added.

Regarding the addition frequency, the oxidation-based slime inhibitor is preferably added once or more during a predetermined period, and the predetermined period is preferably five days, more preferably four days, still more preferably three days, far still more preferably two days and more preferably one day. Regarding "during a predetermined period", the oxidation-based slime inhibitor may be added "every predetermined interval" and, for example, may be added once every three days or may be added once every day. In addition, the oxidation-based slime inhibitor may be added once or more during one day every one to two days (more preferably every other day).

The number of times of the addition of the oxidation-based slime inhibitor is not particularly limited, but a preferable upper limit value is preferably 10 times or less, more preferably five times or less, still more preferably three times or less, far still more preferably twice or less and more preferably once. The oxidation-based slime inhibitor may be added this number of times "during a predetermined period" or "at predetermined intervals".

Regarding the addition frequency, as a more preferable aspect, the oxidation-based slime inhibitor is preferably added once or more during three days, more preferably added once or more during two days and still more preferably added once or more during one day.

The addition period of the oxidation-based slime inhibitor is not particularly limited, but a preferable lower limit value per addition (period) is preferably 0.1 minutes or longer, more preferably one minute or longer, still more preferably 10 minutes or longer and far still more preferably 30 minutes or longer, and a preferable upper limit value is preferably 1000 minutes or shorter, more preferably 500 minutes or shorter, still more preferably 300 minutes or shorter and far still more preferably 120 minutes or shorter. A preferable numerical range is preferably 10 minutes or longer and 300 minutes or shorter and more preferably 30 minutes or longer and 120 minutes or shorter.

In the present specification, "the addition period of the oxidation-based slime inhibitor" is also referred to as "the addition period of the first step" or "first intermittent addition period".

In the present specification, "the addition period of the oxidation-based slime inhibitor" refers to "an addition period from the beginning of the addition of the oxidation-based slime inhibitor through the end of the addition of the oxidation-based slime inhibitor", more preferably refers to "a period during which the oxidation-based slime inhibitor is continuously added to an extent that the effect of the present invention is not impaired" and, in a narrower sense, refers to "a period during which the oxidation-based slime inhibitor is continuously added with no stop of the addition".

In the present specification, "one period (specifically, an addition period from the beginning of the addition of a chemical through the end of the addition of the chemical)" of "the addition period of the oxidation-based slime inhibitor" may be defined as "one unit".

In the present specification, "a period during which the oxidation-based slime inhibitor is not added" is also referred to as "a period other than the addition period of the oxidation-based slime inhibitor", "a period other than the addition period of the first step" or "a period other than the first intermittent addition period", and this period is also referred to as "a first addition-free period".

In the present specification, "the period during which the oxidation-based slime inhibitor is not added" refers to "a period from the end of the addition of the oxidation-based slime inhibitor through the beginning of the addition of the oxidation-based slime inhibitor (that is, addition-free period)", more preferably refers to a period during which the oxidation-based slime inhibitor is not continuously added to an extent that the effect of the present invention is not impaired and, in a narrower sense, refers to "a period during which the addition of the oxidation-based slime inhibitor is not performed and the oxidation-based slime inhibitor is not continuously added".

In the present specification, "one period (specifically, an addition-free period from the end of the addition of a chemical through the beginning of the addition of the chemical)" of "the period during which the oxidation-based slime inhibitor is not added" may be defined as "one unit".

The addition concentration of the oxidation-based slime inhibitor with respect to a water system (mg/1 L of the water system (as total chlorine concentration)) is not particularly limited, but a preferable lower limit value of the total chlorine concentration is preferably 0.1 mg/L or higher (more preferably 0.5 mg/L or higher), more preferably 1 mg/L or higher, still more preferably 2 mg/L or higher, far still more preferably 5 mg/L or higher, more preferably 10 mg/L or higher and still more preferably 25 or 30 mg/L or higher, and a preferable upper limit value is preferably 600 mg/L or lower and more preferably 60 mg/L or lower. A preferable numerical range is preferably 0.1 to 600 mg/L and more preferably 2 to 60 mg/L.

As a preferable aspect of the present invention, the addition concentration of the oxidation-based slime inhibitor is preferably adjusted to be higher than the addition concentration of the organic-based slime inhibitor to be described below. When the addition concentration of the organic-based slime inhibitor is assumed to be 1 mg/L (as chemical mass concentration), a preferable lower limit value of the addition concentration of the oxidation-based slime inhibitor (mg/L (as total chlorine concentration)) is preferably 1 or more, more preferably 1.5 or more, still more preferably 2 or more and far still more preferably 3 or more, and a preferable upper limit value is preferably 100 or less, more preferably 50 or less and still more preferably 40 or 30 or less. When the addition concentration of the organic-based slime inhibitor is assumed to be 1 mg/L (as chemical mass concentration), a preferable numerical range of the oxidation-based slime inhibitor (mg/L (as total chlorine concentration)) is preferably 2 to 50 and more preferably 3 to 40.

The absolute amount (mg/(L/h)) of the oxidation-based slime inhibitor that is added to the water system per addition period is not particularly limited and can be calculated from "the addition period of the oxidation-based slime inhibitor per unit×the addition concentration of the oxidation-based slime inhibitor at that time (mg/L (as total chlorine concentration))", and a preferable lower limit value of the total chlorine concentration is preferably 0.05 mg/(L/h) or higher, more preferably 0.1 mg/(L/h) or higher, still more preferably 0.5 mg/(L/h) or higher, far still more preferably 1 mg/(L/h) or higher, more preferably 2.5 mg/(L/h) or higher, more preferably 5 mg/(L/h) or higher, more preferably 5 mg/(L/h) or higher, more preferably 10 mg/(L/h) or higher, more preferably 20 mg/(L/h) or higher, more preferably 25 mg/(L/h) or higher and more preferably 30 mg/(L/h) or higher, and a preferable lower limit value is preferably 10000 mg/(L/h) or lower, still more preferably 5000 mg/(L/h) or lower, still more preferably 1000 mg/(L/h) or lower and more preferably 500 mg/(L/h) or lower. A preferable numerical range is preferably 0.05 to 10000 mg/(L/h), more preferably 2.5 to 5000 mg/(L/h) and more preferably 2.5 to 1000 mg/(L/h).

In addition, it is preferable that the first addition step has a period during which the oxidation-based slime inhibitor is added to the water system by intermittently adding the oxidation-based slime inhibitor (hereinafter, also referred to as "the first intermittent addition period") and a period during which the oxidation-based slime inhibitor is not added (hereinafter, "the first addition-free period") and these periods come sequentially or in no particular order. These periods preferably come sequentially, and, in this case, any of the first intermittent addition period and the first addition-free period may come first, and the first addition-free period may come after the first intermittent addition period or the first intermittent addition period may come after the first addition-free period. In addition, the number of times of each of the first intermittent addition period and the first addition-free period during the entire operation period of the water system may be one or more.

The one unit of the first intermittent addition period is not particularly limited, it is possible to adopt the configuration or the like in the description of "the addition period of the oxidation-based slime inhibitor", and a preferable numerical range is preferably one to 1000 minutes and more preferably 10 to 300 minutes.

The one unit of the first addition-free period is not particularly limited, but a preferable lower limit value is preferably one hour or longer, more preferably three hours or longer, still more preferably five hours or longer and far still more preferably 10 hours or longer, and a preferable upper limit value is preferably 200 hours or shorter, more preferably 150 hours or shorter, still more preferably 100 hours or shorter and far still more preferably 50 hours or shorter. A preferable numerical range is preferably five to 100 hours and more preferably 10 to 50 hours.

The period ratio between the first intermittent addition period per unit and the first addition-free period per unit during the total period of "the first intermittent addition period per unit and the first addition-free period per unit" is not particularly limited, but it is preferable that the first intermittent addition period per unit is a shorter period than the first addition-free period per unit from the viewpoint of stably operating the water system over a long period of time while reducing the addition amount of a chemical used in the water system. The period ratio between the first intermittent addition period per unit and the first addition-free period per unit is preferably 1:2 to 500, more preferably 1:3 to 200, still more preferably 1:5 to 100 and far still more preferably 1:7 to 50.

The first intermittent addition period per unit may be an average value obtained by dividing the total period (days, hours or the like) of the first intermittent addition periods during a certain operation period by the number of the first intermittent addition periods during this operation period. In addition, the first addition-free period per unit may be an average value obtained by dividing the total period (days, hours or the like) of the first addition-free periods during a certain operation period by the number of the first addition-free periods during this operation period.

In addition, the operation period of the first addition step in the present embodiment may be one period of "the first intermittent addition period per unit and the first addition-free period per unit" or may be a period composed of a combination of a plurality of the same or different periods of "the first intermittent addition period per unit and the first addition-free period per unit".

<Oxidation-Based Slime Inhibitor>

The oxidation-based slime inhibitor or a component thereof is not particularly limited, examples thereof include combined halogen compounds and the like, the oxidation-based slime inhibitor may be a chemical containing a combined halogen compound, and examples of a halogen include chlorine, bromine and the like.

Examples of the combined halogen compounds include combined chlorine-based compounds, combined bromine-based compounds and the like, and it is possible to use one or more selected from the above-exemplified combined halogen compounds.

Examples of the combined chlorine-based compounds include stabilized chlorine compounds represented by a halogenated hydantoin compound or the like, chloramine compounds and the like, examples of the combined bromine-based compounds include stabilized bromides, halogenated hydantoin compounds and the like, but the compounds are not limited thereto, and it is possible to use one or more selected from these compounds. As the oxidation-based slime inhibitor or a compound that is used as the oxidation-based slime inhibitor, a commercially available product may be used or a compound obtained by a well-known manufacturing method may be used.

A salt of the combined halogen compound such as a salt of the chloramine compound or a salt of the stabilized bromide is not particularly limited, examples thereof include alkali metal salts such as sodium salts and potassium salts; alkaline earth metal salts such as calcium salts, strontium salts and barium salts; other metal salts such as manganese salts, copper salts, zinc salts, iron salts, cobalt salts and nickel salts; ammonium salts, organic ammonium salts and the like; amino acid salts such as guanidine salts; and the like, and it is possible to use one or more selected from these salts.

<Chloramine Compound>

The chloramine compound refers to a compound having at least one bond between a nitrogen atom and a chlorine atom (N—Cl bond).

Examples of the chloramine compound include chloramines, chlorosulfamic acid compounds, other chloramine compounds and the like, and it is possible to use one or more selected from these chloramine compounds.

Examples of the chloramine compound include stabilized chlorine compounds and the like that are generated from a compound containing a stabilizer and a chlorine-based oxide; chlorosulfamic acid compounds and the like that are generated from a compound containing a sulfamic acid compound and a chlorine-based oxide; and the like, and it is possible to use one or more selected from these chloramine compounds.

The stabilizer is not particularly limited as long as a combined halogen (preferably, a stabilized combined halogen) can be generated, preferable examples thereof include compounds having an amino group such as ammonia salts and sulfamic acid compounds and the like, and it is possible to use one or more selected from these stabilizers. In the present specification, a monovalent functional group formed by excluding hydrogen from ammonia, a primary amine or a secondary amine (—NH$_2$, —NHR or —NRR') is referred to as "amino group".

Examples of the ammonium salts include ammonium sulfate, ammonium nitrate, ammonium chloride and the like, and it is possible to use one or more selected from these ammonium salts. Among these, ammonium sulfate is preferable.

The sulfamic acid compound that configures the chlorosulfamic acid compound is preferably a compound represented by $R^1R^2NSO_3H$ . . . [1]. $R^1$ and $R^2$ in the general formula [1] are each preferably independently H, an alkyl group having 1 to 8 carbon atoms or a functional group having a benzene ring.

Examples of the sulfamic acid compound include sulfamic acids in which both the $R^1$ groups and the $R^2$ group are all a hydrogen atoms (amide sulfates) or salts thereof; sulfamic acids in which one of both the $R^1$ groups and the $R^2$ group is a hydrogen atom and the other is an alkyl group having 1 to 8 carbon atoms, such as N-methylsulfamic acid, N-ethylsulfamic acid, N-propylsulfamic acid, N-isopropylsulfamic acid and N-butylsulfamic acid, or salts thereof; sulfamic acids in which both the $R^1$ groups and the $R^2$ group are all an alkyl group having 1 to 8 carbon atoms, such as N,N-dimethylsulfamic acid, N,N-diethylsulfamic acid, N,N-dipropylsulfamic acid, N,N-dibutysulfamic acid, N-methyl-N-ethylsulfamic acid and N-methyl-N-propylsulfamic acid, or salts thereof; and the like, but the sulfamic acid compound is not limited thereto. It is possible to use one or more selected from these sulfamic acid compounds.

The chlorine-based oxide is not particularly limited, examples thereof include chlorine gas, chlorine dioxide, hypochlorous acid or salts thereof, chlorous acid or salts thereof, chloric acid and salts thereof, perchloric acid and salts thereof, chlorinated isocyanuric acid and salts thereof and the like, and it is possible to use one or more selected from these chlorine-based oxides.

Examples of hypochlorites include alkali metal hypochlorites such as sodium hypochlorite and potassium hypochlorite; alkaline earth metal hypochlorites such as calcium hypochlorite and barium hypochlorite; and the like, and it is possible to use one or more selected from these hypochlorites.

Examples of chlorites include alkali metal chlorites such as sodium chlorite and potassium chlorite; alkaline earth metal chlorites such as barium chlorite; other metal chlorites such as nickel chlorite; and the like, and it is possible to use one or more selected from these chlorites.

Examples of chlorates include ammonium chlorate; alkali metal chlorates such as sodium chlorate and potassium chlorate; alkaline earth metal chlorates such as calcium chlorate and barium chlorate; and the like, and it is possible to use one or more selected from these chlorates.

Examples of perchlorates include sodium perchlorate, potassium perchlorate and the like, and it is possible to use one or more selected from these perchlorates.

Examples of chlorinated isocyanurates include Sodium chlorinated isocyanurate and the like, and it is possible to use one or more selected from these chlorinated isocyanurates.

Examples of a manufacturing example of the chloramine compound include a method in which an aqueous solution of a stabilizer (for example, an aqueous solution of a sulfamic acid compound or the like) and an aqueous solution of a chlorine-based oxide (for example, a sodium hypochlorite aqueous solution or the like) are mixed in the presence of an alkali, and the chloramine compound can be generated from at least a stabilizer and a chlorine-based oxide. The pH of a chemical containing the manufactured chloramine compound is preferably 12 or higher and more preferably 13 or higher.

For example, as a manufacturing example of sodium chlorosulfate, it is possible to refer to a method described in [Examples] of Patent Literature 3 (WO 2011/125762; Japanese Patent No. 5720964).

The proportions of the chlorine-based oxide and the stabilizer (for example, an ammonia salt, a sulfamic acid compound or the like) used are not particularly limited, but the concentration of a chlorine stabilizer (preferably a sulfamic acid compound) is preferably set to 0.5 to 5.0 mol, more preferably set to 0.5 to 2.0 mol and still more preferably 1.0 to 1.5 mol with respect to 1 mol of the total chlorine concentration (Cl$_2$) of a chlorine-based oxidant. The proportions used may be proportions contained in the chemical.

Regarding the proportions of the alkali and the chlorine-based oxide used, Cl/alkali metal (mole ratio) is preferably 0.3 to 0.4 and more preferably 0.30 to 0.36, and the proportions used may be proportions contained in the chemical.

As the sulfamic acid compound, narrowly-defined sulfamic acids in which $R^1$ and $R^2$ are each H are more preferable, but it is also possible to use N-methylsulfamic acid, N,N-dimethylsulfamic acid, N-phenylsulfamic acid, chloramine T and the like. The sulfamic acid compound may be used in a state of a (powdery) acid from which a sulfamic acid of the compound has been liberated and may be a salt such as an alkali metal salt such as a sodium salt, a potassium salt or a lithium salt. It is possible to use one or more selected from these sulfamic acid compounds.

Chlorosulfamic acid refers to sulfamic acid ($H_2NSO_2OH$) in which at least one hydrogen atom in a $NH_2$ group has been substituted by a chlorine atom. Examples of the chlorosulfamic acid include monochlorosulfamic acid, dichlorosulfamic acid and the like.

Chlorosulfamate refers to sulfamic acid ($H_2NSO_2OH$) in which at least one hydrogen atom in a OH group has been substituted by a metal ion (for example, an alkali metal ion such as a lithium ion, a sodium ion or a potassium ion).

Examples of the chlorosulfamate include lithium chlorosulfate, sodium chlorosulfate, potassium chlorosulfate and the like, and it is possible to use one or more selected from these chlorosulfamates. Among these, sodium chlorosulfate is preferable.

In addition, as other chloramine compounds, chloramine T and the like can be used. In addition, it is possible to use one or more selected from these other chloramine compounds.

<Stabilized Bromide>

The stabilized bromide refers to a compound having at least one bond between a nitrogen atom and a chlorine atom (N—Cl bond) or a carbon atom and a bromine atom. The stabilized bromide does not easily change due to decomposition or the like in water, and a bromide that can be stably present in water after being generated is preferable.

Examples of the stabilized bromide include reaction products of "a reaction product of a bromine-based oxidant or a bromine compound and a chlorine-based oxide" and "a sulfamic acid compound" and the like, but the stabilized bromide is not limited thereto. The pH of the reaction product is preferably alkaline, more preferably 11 or higher, still more preferably 12 or higher and far still more preferably 13 or higher. As the stabilized bromide, a commercially available product may be used or a stabilized bromide obtained by a well-known manufacturing method may be used.

The bromine-based oxidant is not particularly limited, examples thereof include bromine (liquid bromine), bromine chloride, bromic acid, bromate, hypobromous acid and the like, and it is possible to use one or more selected from these bromine-based oxidants.

The bromine compound is not particularly limited, examples thereof include alkali metal bromides such as sodium bromide, potassium bromide and lithium bromide, bromide salts such as ammonium bromide, hydrobromic acid and the like, and it is possible to use one or more selected from these bromine compounds.

For the chlorine-based oxide that is used in the stabilized bromide (for example, hypochlorite, chlorite, chlorate, perchlorate, chlorinated isocyanurate or the like), the description of "chlorine-based oxide" in the above-described <chloramine compound> or the like is also true, and it is possible to appropriately adopt the configuration or the like in the description. Among these, hypochlorite (for example, sodium hypochlorite) is preferable.

For "sulfamic acid compound", the description of "sulfamic acid compound" in "the sulfamic acid compound that configures the chlorosulfamic acid compound is preferably a compound represented by $R^1R^2NSO_3H$—[1]" of the above-described <chloramine compound> or the like is also true, and it is possible to appropriately adopt the configuration or the like in the description. Among "sulfamic acid compounds", sulfamic acids or salts thereof are preferable.

Examples of a manufacturing example of the stabilized bromide include a method in which a sodium bromide aqueous solution and sodium hypochlorite are mixed to produce a solution mixture 1, incidentally, a sulfamic acid aqueous solution and a sodium hydroxide aqueous solution are mixed to produce a solution mixture 2 and the solution mixture 1 and the solution mixture 2 are mixed in the presence of an alkali.

For example, bromamine composed of an ammonium salt and bromine or bromosulfamic acid, bromosulfamate, as a different compound, DBNPA or the like can be used.

<Halogenated Hydantoin Compound>

Examples of the halogenated hydantoin compound include 1-bromo-3-chloro-5,5-dimethylhydantoin (also referred to as "BCDMH"), 1,3-dichloro-5,5-dimethylhydantoin, 1,3-dibromo-5,5-dimethylhydantoin, 1-bromo-3-chloro-5,5-diethylhydantoin, 1,3-dichloro-5,5-diethylhydantoin, 1-bromo-3-chloro-5-methyl-5-ethylhydantoin and the like, and it is possible to use one or more selected from these halogenated hydantoin compounds. Among these, from the viewpoint of the balance of the elution rate in the case of coming into contact with water with a solid preparation (B), easy procurement or the like, BCDMH and 1,3-dichloro-5,5-dimethylhydantoin are preferable.

The halogenated hydantoin compound may be a commercially available product and can be obtained by a well-known manufacturing method. For example, a hydantoin compound (for example, hydantoin (chemical formula: $C_3H_4N_2O_2$) or the like) is used as a stabilizer, and the stabilizer and the chlorine-based oxide and/or bromine-based oxidant are reacted with each other, whereby the halogenated hydantoin compound can be obtained. As the hydantoin compound, compounds having a hydantoin skeleton can be exemplified, examples of the hydantoin compound include hydantoins, 5,5-dialkylhydantoins (for example, 5,5-dimethylhydantoin, 5-methylethylhydantoin, 5-methylbutylhydantoin, 5-ethylbutylhydantoin and the like) and the like, and it is possible to use one or more selected from these hydantoin compounds. The "dialkyl" may be the same or different alkyl group, as the alkyl group, for example, alkyl groups having 1 to 5 carbon atoms (preferably having 1 to 3 carbon atoms) are exemplified, the alkyl group may be linear or branched, examples of the alkyl group include a methyl group, an ethyl group, a butyl group and the like, and it is possible to use one or more selected from these salts.

The oxidation-based slime inhibitor may contain an arbitrary component or an arbitrary chemical as appropriate to an extent that the effect of the present invention is not impaired. Examples of the arbitrary component or the arbitrary chemical include a corrosion inhibitor (corrosion inhibitor), a scale inhibitor, a slime control agent, a solvent or dispersion medium such as water, a dispersant enzyme, a bactericide, a defoamer and the like, but the arbitrary component or the arbitrary chemical is not limited thereto, and a variety of chemicals that can be ordinarily used in water treatments may be used. One or more from these arbitrary components or arbitrary chemicals can be selected as appropriate.

In addition, in the first step of the present embodiment, aside from the addition or use of the oxidation-based slime inhibitor, the arbitrary component or the arbitrary chemical may be further added or used as appropriate.

1-1-2. First Supply Step

The first supply step is preferably a step for intermittently supplying water to be treated containing the oxidation-based slime inhibitor to the reverse osmosis membrane device, and, when this first supply step and a second supply step in the following second step are combined together, it is possible to operate the water system over a longer period of time. As a more preferable aspect, it is possible to inhibit biofouling that occurs in a reverse osmosis membrane provided in the reverse osmosis membrane device, and it is possible to stably operate the water system over a long period of time by inhibiting the biofouling.

At the time of intermittently supplying the water to be treated containing the oxidation-based slime inhibitor to the reverse osmosis membrane device, the first supply step has a period during which the water to be treated containing the oxidation-based slime inhibitor is supplied (also referred to as "first intermittent supply period") and a period during which the water to be treated containing the oxidation-based slime inhibitor is not supplied (also referred to as "first supply-free period").

As a variety of conditions in the first supply step, it is possible to adopt the configuration or the like described in the "1-1-1. first addition step" as appropriate.

For example, as the supply frequency, a predetermined period thereof, the number of times of supply, the supply frequency, the supply period, the supply concentration of the oxidation-based slime inhibitor with respect to the water system, the absolute amount of the oxidation-based slime inhibitor that is supplied to the water system per supply period, one unit of the first supply period, the period ratio between the first intermittent supply period per unit and the first supply-free period per unit and the like in the first supply step, it is possible to adopt the addition frequency, a predetermined period thereof, the number of times of addition, the addition frequency, the addition period, the addition concentration of the oxidation-based slime inhibitor with respect to the water system, the absolute amount of the oxidation-based slime inhibitor that is added to the water system per addition period, one unit of the first addition period, the period ratio between the first intermittent addition period per unit and the first addition-free period per unit and the like in the "1-1-1. first addition step" as appropriate.

The supply frequency of the water to be treated containing the oxidation-based slime inhibitor is not particularly limited, but the water to be treated is preferably supplied once or more during a predetermined period and more preferably supplied once during the predetermined period. The water to be treated may be supplied at this supply frequency "during the predetermined period" or "at predetermined intervals".

The number of times of the supply of the oxidation-based slime inhibitor is not particularly limited, but a preferable upper limit value is more preferably twice or less and still more preferably once. The supply frequency of the water to be treated containing the oxidation-based slime inhibitor is preferably one or more times of supply during three days, more preferably one or more during two days (more preferably every other day) and still more preferably once or more times of supply during one day. In addition, the water to be treated may be supplied this number of times "during a predetermined period" or "at predetermined intervals".

Regarding the supply frequency of the oxidation-based slime inhibitor, as a more preferable aspect, the water to be treated is preferably supplied once or more during three days and more preferably supplied once or more during one day.

The supply period of the water to be treated containing the oxidation-based slime inhibitor is not particularly limited, but a preferable numerical range per supply (period) is preferably 10 minutes or longer and 300 minutes or shorter and more preferably 30 minutes or longer and 120 minutes or shorter.

In the present specification, "the supply period of the water to be treated containing the oxidation-based slime inhibitor" refers to "a supply period from the beginning of the supply of the oxidation-based slime inhibitor through the end of the supply of the oxidation-based slime inhibitor" and, in a narrower sense, refers to "a period during which the oxidation-based slime inhibitor is continuously supplied with no stop of the supply".

In addition, in the present specification, "the supply period of the water to be treated containing the oxidation-based slime inhibitor" is also referred to as "the supply period of the first step" or "first intermittent supply period".

In addition, in the present specification, "one period (specifically, a supply period from the beginning of the supply of a chemical through the end of the supply of the chemical)" of "the supply period of the water to be treated containing the oxidation-based slime inhibitor" may be defined as "one unit".

In the present specification, "the period during which the water to be treated containing the oxidation-based slime inhibitor is not supplied" is also referred to as "a period other than the supply period of the oxidation-based slime inhibitor", "a period other than the supply period of the first step" or "a period other than the first intermittent supply period", and this period is also referred to as "a first supply-free period".

In the present specification, "the period during which the water to be treated containing the oxidation-based slime inhibitor is not supplied" refers to "a supply-free period from the end of the supply of the oxidation-based slime inhibitor through the beginning of the supply of the oxidation-based slime inhibitor" and, in a narrower sense, refers to "a period during which the oxidation-based slime inhibitor is not continuously supplied with no supply to the reverse osmosis membrane device".

In the present specification, "one period (specifically, a supply-free period from the end of the supply of a chemical through the beginning of the supply of the chemical)" of "the period during which the water to be treated containing the oxidation-based slime inhibitor is not supplied" may be defined as "one unit".

The supply concentration of the oxidation-based slime inhibitor with respect to a water system (chemical mg/1 L of the water system) is not particularly limited, but a preferable lower limit value of the total chlorine concentration is preferably 0.1 mg/L or higher (more preferably 0.5 mg/L or higher), more preferably 1 mg/L or higher, still more preferably 2 mg/L or higher, far still more preferably 5 mg/L or higher, more preferably 10 mg/L or higher and still more preferably 25 mg/L or higher, and a preferable numerical range is preferably 5 to 500 mg/L and more preferably 25 to 300 mg/L.

The absolute amount (mg×hours) of the oxidation-based slime inhibitor that is supplied to the reverse osmosis membrane device per supply period is not particularly limited and can be calculated from "the supply period of the water to be treated containing the oxidation-based slime inhibitor per unit×the supply concentration of the oxidation-based slime inhibitor at that time", and a preferable lower limit value of the total chlorine concentration is preferably 0.05 mg/(L/h) or higher, more preferably 0.1 mg/(L/h) or higher, still more preferably 0.5 mg/(L/h) or higher, far still more preferably 1 mg/(L/h) or higher, more preferably 2.5 mg/(L/h) or higher, more preferably 10 mg/(L/h) or higher and still more preferably 25 mg/(L/h) or higher, and a preferable numerical range is preferably 0.05 to 10000 mg/(L/h), more preferably 2.5 to 5000 mg/(L/h) or lower and more preferably 10 to 1000 mg/(L/h).

In addition, it is preferable that the first supply step has a period during which the water to be treated containing the oxidation-based slime inhibitor is supplied to the reverse osmosis membrane device by supplying the water to be treated containing the oxidation-based slime inhibitor to the reverse osmosis membrane device (hereinafter, also referred to as "first intermittent supply period") and a period during which the water to be treated containing the oxidation-based slime inhibitor is not supplied to the reverse osmosis membrane device (hereinafter, also referred to as "first supply-free period"), and these periods come sequentially or in no particular order. It is preferable that these periods come sequentially. The order of these first intermittent supply period and first addition supply-free period is preferably based on the above-described order of the first intermittent addition period and first supply-free period. In addition, the number of times of each of the first intermittent supply period and the first supply-free period during the entire operation period of the water system may be one or more.

The one unit of the first intermittent supply period is not particularly limited, and a preferable numerical range is preferably one to 1000 minutes and more preferably 10 to 300 minutes.

The one unit of the first supply-free period is not particularly limited, and a preferable numerical range is preferably five to 100 hours and more preferably 10 to 50 hours.

The period ratio between the first intermittent supply period per unit and the first supply-free period per unit during the total period of "the first intermittent supply period per unit and the first supply-free period per unit" is not particularly limited, but the first intermittent supply period per unit is preferably a shorter period than the first supply-free period per unit and, furthermore, more preferably 1:7 to 50.

The first intermittent supply period per unit may be an average value obtained by dividing the total period (days or the like) of the first intermittent supply periods during a certain operation period by the number of the first intermittent supply periods during this operation period. In addition, the first supply-free period per unit may be an average value obtained by dividing the total period (days or the like) of the first supply-free periods during a certain operation period by the number of the first supply-free periods during this operation period.

In addition, the operation period of the first supply step in the present embodiment may be one period of "the first intermittent supply period per unit and the first supply-free period per unit" or may be a period composed of a combination of a plurality of the same or different periods of "the first intermittent supply period per unit and the first supply-free period per unit". This one period or plurality of periods combined is preferably based on one period of "the first intermittent addition period per unit and the first addition-free period per unit" or a plurality of the periods combined.

1-2. Second Step where Organic-Based Slime Inhibitor is Used

In the second step, it is preferable that the organic-based slime inhibitor is added at least during a period other than the addition period of the first step and the water to be treated containing the organic-based slime inhibitor is supplied to the reverse osmosis membrane device.

Furthermore, the second step preferably has a second addition step for adding the organic-based slime inhibitor and a second supply step for supplying the water to be treated containing the organic-based slime inhibitor after the addition to the reverse osmosis membrane device.

1-2-1. Second Addition Step

The second addition step is a step for adding the organic-based slime inhibitor at least during "the period other than the addition period of the first step". This makes it possible to obtain water to be treated containing the organic-based slime inhibitor and makes it possible to supply the water to be treated containing the organic-based slime inhibitor after the addition to a reverse osmosis membrane device (for example, refer to FIG. 1 and FIG. 2).

In the second addition step, the organic-based slime inhibitor is preferably added at least during "the period other than the addition period of the first step".

Figure 2:
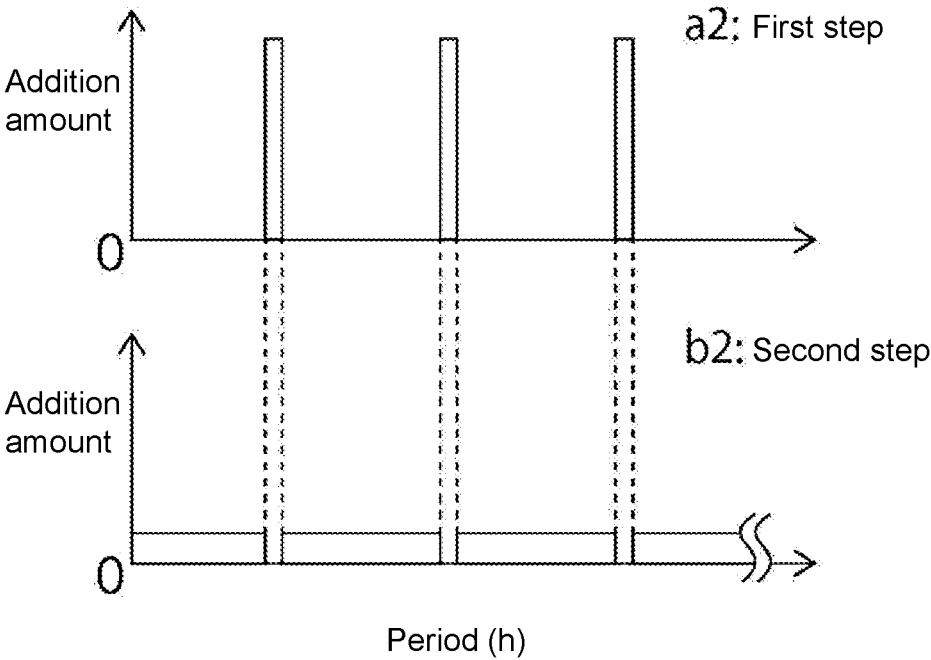
FIG. 2 is a schematic view showing an example of the controls of the first addition step and a second addition step according to the embodiment of the present invention. a2: In the first addition step, the oxidation-based slime inhibitor is intermittently added at equal intervals. b2: In the second addition step, the organic-based slime inhibitor is continuously added during a period other than the addition period of the first addition step. The horizontal axis is the operation period (hours), and the vertical axis is the addition amount.

Here, "the period other than the addition period of the first step" in the second addition step is also referred to as "the addition of the organic-based slime inhibitor at least during the first addition-free period", but the organic-based slime inhibitor may be added during both periods of the first addition-free period and the first intermittent addition period and the organic-based slime inhibitor may be added during the period of the first addition-free period only (for example, refer to FIG. 1 and FIG. 2).

The addition of the organic-based slime inhibitor in the first addition-free period in the second addition step may be the addition of the organic-based slime inhibitor in the entire period or partial period of the first addition-free period.

In addition, the addition of the organic-based slime inhibitor in the first intermittent addition period in the second addition step may be the addition of the organic-based slime inhibitor in the entire period or partial period of the first intermittent addition period.

In addition, in the second addition step, between the entire period and partial period of the first addition-free period, the organic-based slime inhibitor is preferably added during the entire period of the first addition-free period. The partial period of the first addition-free period is preferably 50% or more, more preferably 70% or more, still more preferably 90% or more, far still more preferably 95% or more, more preferably 98% or more, still more preferably 99% or more and far still more preferably 100% (also referred to as the entire period) with respect to the entire period of the first addition-free period.

In the second addition step, the organic-based slime inhibitor is more preferably added continuously or discontinuously during "at least the period other than the addition period of the first step", but still more preferably added continuously and far still more preferably added at all times.

In addition, in the second addition step, the organic-based slime inhibitor is more preferably added continuously or discontinuously at least during "the first addition-free period per unit", but still more preferably added continuously.

In the present specification, regarding the expression "discontinuous", a period during which the organic-based slime inhibitor is added and a period during which the addition is stopped may be present as long as the effect of the present invention is not impaired, but the addition period is preferably longer than the stop period, and the stop period is preferably $\frac{1}{10}$ or less, more preferably 5/100 or less, still more preferably 2.5/100 or less and far still more preferably $\frac{1}{500}$ or less of the addition period.

In the present specification, a period during which the organic-based slime inhibitor is "continuously" added refers to "an addition period from the beginning of the addition of the organic-based slime inhibitor through the end of the addition of the organic-based slime inhibitor", more preferably refers to "a period during which the organic-based slime inhibitor is continuously added to an extent that the effect of the present invention is not impaired" and, in a narrower sense, refers to "a period during which the organic-based slime inhibitor is continuously added with no stop of the addition", and this is also referred to as "constant addition period". Examples of this "constant addition period" include "zero minutes of the addition-free period and 60 minutes of the addition period" when the operation period is 60 minutes.

In the present specification, regarding the expression "continuous", there may be a period during which the chemical is stopped as long as approximately the same effect as the constant addition of the present invention is exhibited, and, as a more specific preferable aspect, the period during which the chemical is stopped during one day is preferably 60 minutes or shorter, more preferably 30 minutes or shorter, still more preferably 15 minutes or shorter, far still more preferably five minutes or shorter and more preferably zero minutes (also referred to as "constant addition period"). In addition, the period during which the chemical is stopped during one hour of operation is preferably five minutes or shorter, more preferably one minute or shorter and still more preferably zero minutes (also referred to as "constant addition period").

The addition period of the organic-based slime inhibitor is not particularly limited, and, for example, the entire period of the operation of the reverse osmosis membrane device or the entire period of the first step may be designated as the addition period of the organic-based slime inhibitor; however, as a more specific aspect, a preferable lower limit value per addition (period) is preferably 0.1 days or longer, more preferably 0.3 days or longer, still more preferably 0.5 days or longer and far still more preferably one day or longer, and a preferable upper limit value is preferably 30 days or shorter, more preferably 10 days or shorter, still more preferably seven days or shorter and far still more preferably three days or shorter. A preferable numerical range is preferably 0.5 days or longer and seven days or shorter and more preferably one day or longer and three days or shorter.

The addition concentration of the organic-based slime inhibitor with respect to the water system (mg (as chemical mass)/1 L of the water system) is not particularly limited, but a preferable lower limit value of the chemical mass concentration is preferably 0.001 mg/L or higher, more preferably 0.01 mg/L or higher, still more preferably 0.05 mg/L or higher and far still more preferably 0.1 mg/L or higher, and a preferable upper limit value is preferably 10000 mg/L or lower, more preferably 1000 mg/L or lower, still more preferably 100 mg/L or lower, and far still more preferably 50 mg/L or lower. A preferable numerical range is preferably 0.01 to 100 mg/L and more preferably 0.1 to 50 mg/L.

The absolute amount (mg (as chemical mass)) of the organic-based slime inhibitor that is supplied to the water system per addition period is not particularly limited and can be calculated from "the addition period of the organic-based slime inhibitor per unit×the addition concentration of the organic-based slime inhibitor at that time", and a preferable lower limit value is preferably 0.002 mg/(L/h) or higher, more preferably 0.02 mg/(L/h) or higher, still more preferably 0.2 mg/(L/h) or higher and far still more preferably 2 mg/(L/h) or higher, and a preferable upper limit value is preferably 6000000 mg/(L/h) or lower, more preferably 300000 mg/(L/h) or lower, still more preferably 30000 mg/(L/h) or lower and far still more preferably 3000 mg/(L/h) or lower. A preferable numerical range is preferably 0.2 to 30000 mg/(L/h) and more preferably 2 to 3000 mg/(L/h).

<Organic-Based Slime Inhibitor>

The organic-based slime inhibitor or a component thereof is not particularly limited, examples thereof include isothiazoline compounds, halocyanoacetamide compounds, aldehyde compounds, oxime compounds represented by tetrazolyloxime or dichloroglyoxime and the like, and it is possible to use one or more from these organic-based slime inhibitors. In addition, the organic-based slime inhibitor may be a chemical containing one or more compounds selected from these. As the organic-based slime inhibitor or a compound that is used as the organic-based slime inhibitor, a commercially available product may be used or a compound obtained by a well-known manufacturing method may be used.

<Isothiazoline Compounds>

The isothiazoline compounds are not particularly limited, examples thereof include 5-chloro-2-methyl-4-isothiazolin-3-one (Cl-MIT), 2-methyl-4-isothiazolin-3-one (MIT), 2-ethyl-4-isothiazolin-3-one, 2-n-octyl-4-isothiazolin-3-one, 5-chloro-2-ethyl-4-isothiazolin-3-one, 5-chloro-2-t-octyl-4-isothiazolin-3-one, 4,5-dichloro-2-n-octyl-4-isothiazolin-3-one, 4,5-dichloro-2-cyclohexyl-4-isothiazolin-3-one and the like, and it is possible to use one or more from these isothiazoline compounds. In addition, as the isothiazoline compounds, complex compounds of the above-described isothiazoline compound and magnesium chloride, magnesium nitrate, copper chloride, copper nitrate, calcium chloride or the like may be used. It is possible to use one or more selected from these isothiazoline compounds.

Among the isothiazoline compounds, 5-chloro-2-methyl-4-isothiazolin-3-one (Cl-MIT), 2-methyl-4-isothiazolin-3-one (MIT) and a mixture thereof are preferable.

<Halocyanoacetamide Compounds>

The halocyanoacetamide compounds are not particularly limited, examples thereof include 2-halo-3-nitrilopropionamide such as 2-chloro-3-nitrilopropionamide and 2-bromo-3-nitrilopropionamide; 2,2-dihalo-3-nitrilopropionamide such as 2,2-dichloro-3-nitrilopropionamide, 2,2-dibromo-3-nitrilopropionamide (DBNPA) and 2-chloro-2-bromo-3-nitrilopropionamide; N—C1-3 alkyl-2-halo-3-nitrilopropionamide such as N-methyl-2-chloro-3-nitrilopropionamide and N-methyl-2-bromo-3-nitrilopropionamide; N—C1-3 alkyl-2,2-dihalo-3-nitrilopropionamide such as N-methyl-2,2-dichloro-3-nitrilopropionamide and N-methyl-2,2-dibromo-3-nitrilopropionamide; and the like, and it is possible to use one or more selected from these halocyanoacetamide compounds.

The halocyanoacetamide compounds may be compounds represented by $NC—CX^1X^2—(C=O)—NHR^3$ . . . [2]. In the general formula [2], $X^1$ and $X^2$ each represent a halogen atom or a hydrogen atom, and at least one of $X^1$ and $X^2$ is a halogen atom. $R^3$ represents a hydrogen atom or an alkyl group having 1 to 3 carbon atoms. Examples of the halogen atom include a chlorine atom and a bromine atom, and a bromine atom is preferable. C1-3 alkyl may be linear or branched, and examples thereof include a methyl group, an ethyl group, a n-propyl group, an iso-propyl group and the like. It is possible to use one or more selected from these halocyanoacetamide compounds.

Among the halocyanoacetamide compounds, dihalonitrilopropionamide is preferable, and, furthermore, among these, 2,2-dibromo-3-nitrilopropionamide (DBNPA) is more preferable.

<Aldehyde Compounds>

The aldehyde compounds are not particularly limited, examples thereof include monoaldehyde compounds such as acetaldehyde; dialdehyde compounds such as glyoxal and orthophthalaldehyde; and the like, and it is possible to use one or more selected from these salts. Among the aldehyde compounds, dialdehyde compounds are preferable, and, among the dialdehyde compounds, glutaraldehyde is preferable from the viewpoint of high safety.

<Oxime Compounds>

The oxime compounds are not particularly limited, examples thereof include oxime compounds having a tetrazole ring ($CH_2N_4$) (for example, tetrazolyl oxime and the like), halogenated oxime compounds (for example, dichloroglyoxime and the like) and the like, and it is possible to use one or more selected from these salts. The oxime compounds are compounds having a structure represented by $>C=N-OH$ in the molecule.

Examples of the oxime compounds having a tetrazole ring include picarbutrazox (molecular formula: $C_{20}H_{23}N_7O_3$, molecular weight: 409.44, CAS No. 500207-04-5) and the like.

Examples of the halogenated oxime compounds include dichloroglyoxime, α-chlorobenzaldoxime, α-chlorobenzaldoxime acetate, 4-hydroxyphenyl-α-ketoacetohydroxymic acid chloride (also known as paracrocs) and the like, and it is possible to use one or more selected from these halogenated oxime compounds.

Among the organic-based slime inhibitors, one or more selected from 2,2-dibromo-3-nitrilopropionamide (DBNPA), 5-chloro-2-methyl-4-isothiazolin-3-one (Cl-MIT), 2-methyl-4-isothiazolin-3-one (MIT), mixtures thereof, glutaraldehyde and the like are preferable.

The organic-based slime inhibitor may contain an arbitrary component or an arbitrary chemical as appropriate to an extent that the effect of the present invention is not impaired. In addition, in the second step of the present embodiment, aside from the addition or use of the organic-based slime inhibitor, the arbitrary component or the arbitrary chemical may be further added or used as appropriate. As the arbitrary component or arbitrary chemical, a variety of chemicals that can be ordinarily used in water treatments may be used, and it is possible to appropriately adopt the configuration or the like in the description of "arbitrary component or arbitrary chemical" of the above-described "oxidation-based slime inhibitor".

1-2-2. Second Supply Step

The second supply step is preferably a step for supplying water to be treated containing the organic-based slime inhibitor to the reverse osmosis membrane device. When this second supply step and the first supply step in the first step are combined together, it is possible to operate the water system over a longer period of time. As a more preferable aspect, it is possible to inhibit biofouling that occurs in a reverse osmosis membrane provided in the reverse osmosis membrane device, and it is possible to stably operate the water system over a long period of time by inhibiting the biofouling.

As a variety of conditions in the second supply step, it is possible to adopt the configuration or the like described in the "1-2-1. second addition step" as appropriate.

For example, as the supply period, the supply concentration of the organic-based slime inhibitor with respect to the water system, the absolute amount of the organic-based slime inhibitor that is supplied to the water system per supply period and the like in the second supply step, it is possible to adopt the addition period, the addition concentration of the organic-based slime inhibitor with respect to the water system, the absolute amount of the organic-based slime inhibitor that is added to the water system per addition period and the like in the "1-2-1. second addition step" as appropriate.

In the second supply step, the water to be treated containing the organic-based slime inhibitor is preferably supplied to the reverse osmosis membrane device during "at least the period other than the supply period of the first step". During the operation period, the water to be treated containing the organic-based slime inhibitor is preferably supplied to the reverse osmosis membrane device continuously or discontinuously, more preferably supplied continuously and more preferably supplied at all times.

In the present specification, the period during which the organic-based slime inhibitor is "continuously" supplied refers to "a supply period from the beginning of the supply of the organic-based slime inhibitor through the end of the supply of the organic-based slime inhibitor" and, in a narrower sense, refers to "a period during which the organic-based slime inhibitor is continuously supplied with no stop of the supply", and this narrow definition is defined as "constant supply period".

The supply period of the organic-based slime inhibitor is not particularly limited, and the entire period of the operation of the reverse osmosis membrane device or the entire period of the first step may be set as the supply period of the organic-based slime inhibitor; however, as a more specific aspect, a preferable numerical range per supply (period) is preferably 0.5 days or longer and seven days or shorter and more preferably one day or longer and three days or shorter.

The supply concentration of the organic-based slime inhibitor with respect to the reverse osmosis membrane device (mg/1 L of the water system (as chemical mass concentration)) is not particularly limited, but a preferable numerical range is preferably 0.01 to 100 mg/L and more preferably 0.1 to 50 mg/L.

The absolute amount (mg) of the organic-based slime inhibitor that is supplied to the reverse osmosis membrane device per supply period is not particularly limited, but a preferable numerical range is preferably 0.2 to 30000 mg/(L/h) and more preferably 2 to 3000 mg/(L/h).

1-3. Controls of First Step and Second Step in Present Embodiment

In the method of the present embodiment, it is preferable to control the first step and the second step, which makes it possible to operate the water system having the reverse osmosis membrane device over a longer period of time.

In the method of the present embodiment, as a more preferable aspect, the first addition step and the second addition step are controlled, whereby it is possible to more favorably supply the water to be treated containing the oxidation-based slime inhibitor and/or the organic-based slime inhibitor to the reverse osmosis membrane device, which makes it possible to stably operate the water system having the reverse osmosis membrane device over a longer period of time. Furthermore, the first addition step and the second addition step are controlled, whereby it is possible to reduce slime that is present in the reverse osmosis membrane of the reverse osmosis membrane device or inhibit an increase in the slime more favorably, which also makes it possible to more favorably inhibit biofouling.

In the method of the present embodiment, the first step and the second step can be performed at the same time or at different times and are more preferably performed at the same time.

In addition, in the method of the present embodiment, the first step and the second step may be performed in parallel or in series and preferably performed in parallel.

In the method of the present embodiment, as a more preferable aspect, the first step and the second step are more preferably performed in parallel at the same time.

In addition, in the method of the present embodiment, while the oxidation-based slime inhibitor is added in the first step (preferably while the oxidation-based slime inhibitor is continuously added), the organic-based slime inhibitor may be added or the addition may be stopped in the second step, and, furthermore, while the oxidation-based slime inhibitor is not added in the first step, the organic-based slime inhibitor is preferably added continuously in the second step.

In the method of the present embodiment, as a more preferable aspect, the first step and/or the second step are more preferably controlled based on the starting point of the operation of the first step and/or the second step, and the starting points of the operation of the first step and the second step may be the same or different.

The starting point of the operation is not particularly limited and may be arbitrarily set, examples thereof include dates (year, month, day, hour, minute and second), the operation statuses of the first step and/or the second step (for example, when to begin operation, when to begin the operation again, when to add the chemical, how to set an arbitrary period and the like) and the like, and it is possible to use one or a combination of two or more selected from these operation statuses.

As a preferable aspect of a more specific starting point of operation, for example, the beginning of the first intermittent addition or the beginning of the first addition-free in the first step may be set as the starting point of operation, anywhere in the second addition period of the second step may be set as the starting point of operation, and the beginning of the first intermittent addition or the beginning of the first addition-free in the first step that is in the second addition period of the second step may be set as the starting point of operation. In addition, in a case where both the first step and the second step are in the addition-free period (for example, maintenance, for the purpose of adjusting the addition timing in both steps, the stop of both steps or the like), the beginning of the addition (the re-beginning of the addition) of the chemical at least in any one of the first step and the second step may be set as the starting point of operation, or when the chemicals are added at the same time in both the first step and the second step may be set as the starting point of operation.

The controls of the first addition step and the second addition step in the present embodiment will be described with reference to FIG. 1 and FIG. 2, but the present embodiment is not limited thereto.

FIG. 1 is a schematic view showing Example 1 of the controls of the first addition step and the second addition step according to the embodiment of the present invention. a1 of Example 1: In the first addition step, the oxidation-based slime inhibitor is intermittently added at equal intervals. b1 of Example 1: In the second addition step, an organic-based slime inhibitor is added at all times. At this time, the organic-based slime inhibitor is added at least during a period other than an addition period of the first addition step. The horizontal axis is the operation period (hours), and the vertical axis is the addition amount. Furthermore, an operation period 0 h of the first addition step and an operation time 0 h of the second addition step may be each set as the starting point of operation. Individual intermittent addition periods of the first addition step may be the same or different periods, and individual intermittent addition amounts may be the same or different amounts. In addition, individual intervals of intermittent addition may be the same or different intervals.

Water to be treated containing the oxidation-based slime inhibitor and/or the organic-based slime inhibitor can be produced by Example 1 of the controls in the present embodiment. In addition, the water to be treated containing the oxidation-based slime inhibitor and/or the organic-based slime inhibitor is supplied to the reverse osmosis membrane device as the first supply step and the second supply step by Example 1 of the controls in the present embodiment. At this time, the water to be treated containing the oxidation-based slime inhibitor and/or the organic-based slime inhibitor can be supplied to the reverse osmosis membrane device in the same patterns as addition patterns of a1 and b1 as shown in FIG. 1. As a more specific example, water to be treated containing only the organic-based slime inhibitor, the water to be treated containing the oxidation-based slime inhibitor and the organic-based slime inhibitor, are supplied to the reverse osmosis membrane device in order.

This makes it possible to stably operate the water system having the reverse osmosis membrane device over a longer period of time. It is possible to reduce slime that is present in the reverse osmosis membrane of the reverse osmosis membrane device or inhibit an increase in the slime more favorably, whereby biofouling can also be more favorably inhibited.

FIG. 2 is an example of a schematic view showing Example 2 of the controls of the first addition step and the second addition step according to the embodiment of the present invention. a2 of Example 2: In the first addition step, the oxidation-based slime inhibitor is intermittently added at equal intervals. b2 of Example 2: In the second addition step, the organic-based slime inhibitor is continuously added during "the period other than the addition period of the first addition step". The horizontal axis is the operation period (hours), and the vertical axis is the addition amount. Furthermore, an operation period 0 h of the first addition step and an operation time 0 h of the second addition step may be each set as the starting point of operation. Portions that are duplicate in the description of FIG. 1 will not be described again as appropriate.

Individual intermittent addition periods of the first addition step may be the same or different periods, and individual intermittent addition amounts may be the same or different amounts. In addition, individual intervals of intermittent addition may be the same or different intervals.

In addition, in the second addition step, the organic-based slime inhibitor may be continuously added during the entire period or partial period of "the period other than the addition period of the first addition step". In addition, in the second addition step, the organic-based slime inhibitor may be added discontinuously.

In addition, as Example 3 of the controls of the first addition step and the second addition step according to the present embodiment, Example 1 of the controls and Example 2 of the controls may be combined together or Example 1 of the controls and Example 2 of the controls may be performed repeatedly or in no particular order. For example, the controls may be performed in order of Example 1 of the controls and then Example 2 of the controls, may be performed in order of Example 2 of the controls and then Example 1 of the controls or may be performed in order of Example 1 of the controls, Example 2 of the controls and Example 2 of the controls.

Water to be treated containing the oxidation-based slime inhibitor and/or the organic-based slime inhibitor can be produced by Example 2 of the controls in the present embodiment. In addition, the water to be treated containing the oxidation-based slime inhibitor and/or the organic-based slime inhibitor is supplied to the reverse osmosis membrane device as the first supply step and the second supply step by Example 2 of the controls in the present embodiment. At this time, the water to be treated containing the oxidation-based slime inhibitor and/or the organic-based slime inhibitor can be supplied to the reverse osmosis membrane device in the same patterns as addition patterns of a2 and b2 as shown in FIG. 2. As a more specific example, water to be treated containing only the organic-based slime inhibitor, the water to be treated containing only the organic-based slime inhibitor, . . . are supplied to the reverse osmosis membrane device in order.

This makes it possible to stably operate the water system having the reverse osmosis membrane device over a longer period of time. It is possible to reduce slime that is present in the reverse osmosis membrane of the reverse osmosis membrane device or inhibit an increase in the slime more favorably, whereby biofouling can also be more favorably inhibited.

Figure 3:
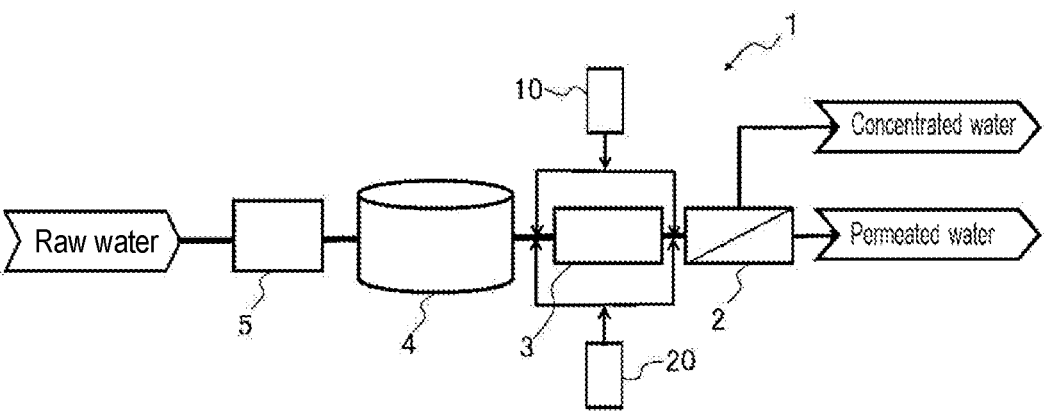
FIG. 3 is an example of a schematic view showing a water system having a reverse osmosis membrane device according to the embodiment of the present invention.

The addition places of the oxidation-based slime inhibitor and/or the organic-based slime inhibitor may be the same place or different places (for example, refer to FIG. 3). The addition places are preferably in the reverse osmosis membrane device where a reverse osmosis membrane treatment is performed and upstream of the reverse osmosis membrane device.

Furthermore, in a case where a safety filter device is provided before the reverse osmosis membrane device in order to perform a safety filter treatment on the water to be treated that is supplied to the reverse osmosis membrane device, the addition places of the oxidation-based slime inhibitor and/or the organic-based slime inhibitor are preferably in the safety filter device or before and after the safety filter and are, furthermore, preferably provided in the safety filter device and upstream of the safety filter device, and, more specifically, it is more preferable to provide a flow path for addition between the safety filter device and a treatment device that is present upstream of the safety filter device.

The safety filter device is capable of performing a turbid membrane removal step to be described below and may be a turbid membrane removal device. The safety filter device can be adopted as appropriate using a membrane that can be used in the turbid membrane removal device (for example, a MF membrane or the like) as the safety filter.

This makes it possible to inhibit slime in a safety filter device and also makes it possible to inhibit slime in the reverse osmosis membrane device, which is present downstream of the safety filter treatment device. In addition, it is also possible to inhibit biofouling in these membrane devices and to further inhibit biofouling in the reverse osmosis membrane device. Therefore, it is possible to operate the water system over a longer period of time.

1-4. Application of Operation Method in Present Embodiment

The operation method in the present embodiment can be applied to reverse osmosis membrane devices. The method of the present embodiment can be applied to slime inhibition methods, biofouling inhibition method, water systems, devices and systems.

The steps according to the present embodiment can be applied to devices or systems. For example, the first step and the second step may be set as a first method and a second method, a first device and a second device or a first system and a second system, respectively.

The operation method in the present embodiment can be applied to water systems having at least a reverse osmosis membrane device.

The water system including the reverse osmosis membrane device is not particularly limited, and examples thereof include water treatment water systems; circulating water systems such as a cooling tower; process water systems such as paper pulp manufacturing, potable water systems, wastewater collection and the like.

As an example of the water system including the reverse osmosis membrane device, an aggregation treatment step for pouring raw water and injecting an aggregating agent into the raw water to form an aggregate or floc of a turbid substance or the like, a solid-liquid separation step for separating a precipitate and a supernatant from water to be treated containing the aggregate and a turbid membrane removal step for further removing the turbid substance or the like from the supernatant that has flowed in before a reverse osmosis membrane treatment may be disposed sequentially or in no particular order. In addition, these treatment steps may be performed using treatment devices or treatment parts configured so as to perform the treatment steps, respectively.

An example of the water system including the reverse osmosis membrane device will be described with reference to, for example, a water system 1 shown in FIG. 3, but the water system according to the present embodiment is not limited thereto. In the water system 1 including a reverse osmosis membrane device 2, an aggregation step that is performed with an aggregation treatment device 5 configured to pour raw water and inject an aggregating agent into the raw water to form an aggregate or floc of a turbid substance or the like, a solid-liquid separation step that is performed with a solid-liquid separation device 4 configured to separate a precipitate and a supernatant from water to be treated containing the aggregate, a pretreatment step that is performed with a safety filter 3 configured to perform a turbid membrane removal treatment for further removing the turbid substance or the like from the supernatant that has flowed in before a reverse osmosis membrane treatment and a reverse osmosis membrane treatment step that is performed with the reverse osmosis membrane device 2 that supplies the water to be treated containing the pretreated oxidation-based slime inhibitor and/or organic-based slime inhibitor are included. The water to be treated is separated into concentrated water and permeated water by the reverse osmosis membrane treatment step.

In addition, as an example of the water system including the reverse osmosis membrane device, a water treatment device (preferably an ultrapure water device) including a raw water supply channel configured to supply raw water and a reverse osmosis membrane device configured to separate the raw water supplied from the raw water supply channel into concentrated water and permeated water can be exemplified.

In addition, as an example of the water system including the reverse osmosis membrane device, a water treatment device including a raw water supply channel configured to supply raw water, a filtration device and a filtration-treated water tank configured to filter the raw water supplied from the raw water supply channel, a safety filter device configured as a pretreatment of a reverse osmosis membrane treatment for this filtered water to be treated and a reverse osmosis membrane device can be exemplified. The turbid membrane removal step may be performed in the safety filter device.

1-4-1. Raw Water

The raw water that is used in the present embodiment (for example, water to be treated) is not particularly limited, and examples thereof include industrial wastewater containing an organic substance, seawater, brackish water, fresh water (river water, lake water and the like), industrial water, city water and the like.

The pH of the raw water or water to be treated is not particularly limited, but is preferably 3 to 9, more preferably 4 to 8 and still more preferably 5 to 8. The pH may be adjusted with a pH adjuster.

The water temperature of the raw water or water to be treated is not particularly limited, but is preferably 4° C. to 50° C. and more preferably 10° C. to 40° C.

TOC of the raw water or water to be treated is not particularly limited, but is preferably 1 to 100 mg/L, more preferably 1 to 50 mg/L and still more preferably 1 to 10 mg/L.

ORP of the raw water or water to be treated is preferably 200 to 600 mV and more preferably 200 to 400 mV 1-4-2. Reverse Osmosis Membrane Device The reverse osmosis membrane device that is used in the present embodiment is not particularly limited, but is preferably configured to be capable of removing ions, an organic substance or the like in the raw water using a reverse osmosis membrane. The reverse osmosis membrane device is preferably configured to be capable of performing seawater desalination, ultrapure water production, industrial water treatments, wastewater recovery treatments, reuse of wastewater and the like. In addition, the reverse osmosis membrane device may include one or a plurality of units having a reverse osmosis membrane. In addition, the water system may have one or a plurality of reverse osmosis membrane devices.

<Reverse Osmosis Membrane>

The membrane that is used in the present embodiment is a reverse osmosis membrane (hereinafter, also referred to as "RO membrane"), a nanofiltration membrane (hereinafter, also referred to as "NF membrane") or the like. The RO membrane is not particularly limited, and examples thereof include polyamide-based RO membranes, polyether sulfone-based RO membranes, polysulfone-based RO membranes, polyimide-based RO membranes, polyethylene imide-based RO membranes, polyethylene oxide-based RO membranes, cellulose acetate-based RO membranes and the like. Among these, polyamide-based RO membranes have a high rejection rate of ionic substances and a fast flow rate and thus have an advantage of being preferably usable.

The conditions of the water to be treated that is supplied to the reverse osmosis membrane device in the present embodiment (hereinafter, also referred to as "supply water") can be set as appropriate depending on the treatment capacity or purpose of the reverse osmosis membrane device or a reverse osmosis membrane step and are not particularly limited.

Examples of the condition for the water to be treated that is supplied to the reverse osmosis membrane device (supply water) include the pH of the supply water, the amount of the supply water, the temperature of the supply water, the water pressure (MPa) of the supply water, TOC (total organic carbon) of the supply water, the oxidation-reduction potential (ORP) of the supply water and the like, and one or more can be selected from these conditions. An organic substance in the supply water is regarded as TOC.

In the present invention, "the water to be treated that is supplied to the reverse osmosis membrane device" is also referred to as "supply water supplied", and the supply water refers to water that is introduced into the reverse osmosis membrane device and treated with a reverse osmosis membrane and corresponds to inlet water of the reverse osmosis membrane device.

The pH of the supply water is not particularly limited, but is preferably 3 to 9, more preferably 4 to 8 and still more preferably 5 to 8. The pH may be adjusted with a pH adjuster.

The amount of the supply water is not particularly limited, but is preferably 5 to 200 mL/min.

The water pressure of the supply water is not particularly limited, but is preferably 0.1 to 10 MPa.

The water temperature of the supply water is not particularly limited, but is preferably 4° C. to 50° C. and more preferably 10° C. to 40° C.

TOC of the supply water is not particularly limited, but is preferably 1 to 100 mg/L, more preferably 1 to 50 mg/L and still more preferably 1 to 10 mg/L.

ORP of the supply water is preferably 200 to 600 mV and more preferably 200 to 400 mV.

In addition, the flow rate of the supply water is preferably 3 to 10 m³/h per 8-inch spiral module.

In the present embodiment, as a more preferable aspect, a pretreatment step for removing the organic substance, the turbid substance or the like from the water to be treated in a pretreatment part before the supply of the water to be treated to the reverse osmosis membrane device may be included.

The water to be treated that is supplied to the reverse osmosis membrane device is preferably pre-treated with the safety filter device. For example, as the pretreatment step, a step for filtering the raw water (water to be treated) with the filtration device and passing the filtration-treated water through the filtration-treated water tank and the safety filter or the like can be exemplified.

This makes it possible to obtain pretreated water to be treated that is supplied to the reverse osmosis membrane device or the reverse osmosis membrane step.

The safety filter is not particularly limited, examples thereof include one or a plurality of microfiltration membrane (MF membrane) treatments, one or a plurality of ultrafiltration membrane (UF membrane) treatments and the like, it is possible to use one or more from these, and these may be combined as appropriate. This makes it possible to reduce an impurity such as the turbid substance of the water to be treated that is supplied to the reverse osmosis membrane device.

In the present embodiment, since the water to be treated that is supplied to the reverse osmosis membrane device more favorably contains the oxidation-based slime inhibitor and/or the organic-based slime inhibitor, it is possible to more favorably inhibit biofouling that occurs in the reverse osmosis membrane device as appropriate, and it is also possible to more favorably and efficiently exhibit an effect attributed to the oxidation-based slime inhibitor and/or the organic-based slime inhibitor (for example, antibacterial, sterilization, algicide, microbial growth inhibition, microbial metabolism inhibition or the like) as appropriate. This makes it possible to expect an effect of inhibiting biofouling that occurs in the reverse osmosis membrane device and also an effect attributed to a chemical that is used.

1-5. Each Measurement Method

<Method for Calculating Total Residual Chlorine Concentration>

The total residual chlorine concentration is calculated based on the following method. It is possible to refer to JIS K 0400-33-10: 1999.

Total residual chlorine concentration=free chlorine concentration+activated combined chlorine concentration+stabilized combined chlorine concentration Free chlorine concentration: Free chlorine concentration by a DPD method (pocket calorimeter, chlorine, manufactured by DKK-TOA Corporation) [here, the free chlorine concentration by the DPD method is a measurement result of the chlorine concentration (mg-$Cl_2$/L) after five to 30 seconds with a DPD (Free) reagent, which is a reagent for measuring free chlorine]

Activated combined chlorine concentration: A value obtained by subtracting the measurement result of the free chlorine concentration (mg-$Cl_2$/L) from a measurement result of the chlorine concentration (mg-$Cl_2$/L) after 300 seconds with the DPD (Free) reagent, which is a reagent for measuring free chlorine Stabilized combined chlorine concentration: A value obtained by subtracting the measurement result of the chlorine concentration (mg-$Cl_2$/L) after 300 seconds with the DPD (Free) reagent, which is a reagent for measuring free chlorine, from a measurement result of the chlorine concentration (mg-$Cl_2$/L) after 180 seconds with a DPD (Total) reagent, which is a reagent for measuring total chlorine Free chlorine percentage (%)=(free chlorine concentration/total residual chlorine concentration)×100

Stabilized combined chlorine percentage (%)=(stabilized combined chlorine concentration/total residual chlorine concentration)×100

The temperature of the testing environment is set to 25° C.

The pH (25° C.) of the water to be treated can be measured with a handy pH meter manufactured by Horiba Corporation. In addition, TOC of the water to be treated can be measured with a TOC meter. ORP of the water to be treated can be measured with an ORP meter.

The method for operating a reverse osmosis membrane device according to the present embodiment may be a method for treating a reverse osmosis membrane. In addition, the operation method according to the present embodiment can be applied to devices or systems.

In addition, in the method for operating a reverse osmosis membrane device according to the present embodiment, the description of individual configurations and the like that are duplicate of the configurations in the following "2.", "3." and the like, such as the first step, the second step, the oxidation-based slime inhibitor and the organic-based slime inhibitor will be omitted as appropriate, but the description of the "2.", "3." and the like is also true for the present embodiment, and it is possible to appropriately adopt the configuration and the like in the description.

2. Slime Control Method that is Applied to Reverse Osmosis Membrane Device According to Present Embodiment In a slime control method that is applied to a reverse osmosis membrane device according to the present invention, the description of individual configurations and the like that are duplicate of the configurations in the "1.", the following "3." and the like, such as the first step, the second step, the oxidation-based slime inhibitor and the organic-based slime inhibitor will be omitted as appropriate, but the description of the "1.", "3." and the like is also true for the present embodiment, and it is possible to appropriately adopt the configuration and the like in the description. In addition, the slime control method according to the present embodiment can be applied to devices or systems.

The slime control method that is applied to a reverse osmosis membrane device according to the present embodiment preferably has a first step for intermittently adding an oxidation-based slime inhibitor and intermittently supplying water to be treated containing the oxidation-based slime inhibitor to a reverse osmosis membrane device and a second step for adding an organic-based slime inhibitor at least during a period other than the addition period of the first step and supplying the water to be treated containing the organic-based slime inhibitor to the reverse osmosis membrane device.

The addition concentration during one addition period of the oxidation-based slime inhibitor is preferably adjusted to be higher than the addition concentration during one addition period of the organic-based slime inhibitor.

The oxidation-based slime inhibitor is preferably added once or more during three days of an operation period.

The oxidation-based slime inhibitor is preferably added for 10 minutes or longer per addition.

0.1 mg/L or more of the oxidation-based slime inhibitor is preferably added in terms of the total chlorine concentration.

0.01 mg/L or more of the organic-based slime inhibitor is preferably added.

3. Water Treatment Device According to Present Embodiment

In a water treatment device according to the present embodiment, the description of individual configurations and the like that are duplicate of the configurations in the "1.", "2." and the like, such as the first step, the second step, the oxidation-based slime inhibitor and the organic-based slime inhibitor will be omitted as appropriate, but the description of the "1.", "2." and the like is also true for the present embodiment, and it is possible to appropriately adopt the configuration and the like in the description.

In addition, the water treatment device according to the present embodiment may be a water treatment device or water system having at least a reverse osmosis membrane device. The water treatment device may be a water treatment water system or a water treatment system.

The water treatment device according to the present embodiment is preferably a water treatment device that performs the methods of the present embodiment having a first step for intermittently adding an oxidation-based slime inhibitor and intermittently supplying water to be treated containing the oxidation-based slime inhibitor to a reverse osmosis membrane device and a second step for adding an organic-based slime inhibitor at least during a period other than the addition period of the first step and supplying the water to be treated containing the organic-based slime inhibitor to the reverse osmosis membrane device.

The water treatment device according to the present embodiment preferably performs the method for operating a reverse osmosis membrane device of the present embodiment or the slime control method that is applied to a reverse osmosis membrane device of the present embodiment.

The water treatment device according to the present embodiment includes a first chemical addition part, a second chemical addition part and a reverse osmosis membrane part, preferably includes a control part that controls these parts and preferably further includes a safety filter part as a pretreatment part before the reverse osmosis membrane part. The first chemical addition part and the second chemical addition part are preferably connected to a flow channel upstream or downstream of the safety filter part and a flow channel upstream of the reverse osmosis membrane part, which makes it possible to add each chemical to water to be treated and to supply the water to be treated containing each chemical to the reverse osmosis membrane device. In addition, each of these parts may be singular or plural, and these parts may be devices.

An example of how to perform the present embodiment will be shown below, but how to perform the present embodiment is not limited thereto. In addition, how to perform the present embodiment may be performed with the control part or may be performed with a device for controlling a water treatment or a device such as a water treatment device, a water treatment system or a water system.

As an example in the present embodiment, a control part configured so as to be capable of performing the first step and the second step or a device including such a control part is preferable. This makes it possible to more favorably perform the methods of the present embodiment.

The control part is capable of controlling and performing the first step and the second step by commanding a chemical addition condition (the addition timing (for example, intermittent or continuous), the addition amount or the like) of the oxidation-based slime inhibitor and the organic-based slime inhibitor that are added to the water to be treated to the first chemical addition part and the second chemical addition part.

In addition, the control part may monitor the supply state of the water to be treated containing the chemical to the reverse osmosis membrane device using a variety of measuring instruments and is also capable of providing feedback of these measurement results to the first chemical addition part and the second chemical addition part and controlling these steps in the first step and the second step.

As a preferable aspect, the control part is capable of controlling and performing the first step and the second step by commanding a more preferable chemical addition status (the addition timing (intermittent or continuous), the addition concentration or the like) to each of the first chemical addition part and the second chemical addition part based on the supply state. This makes it possible to stably operate the water system having the reverse osmosis membrane device over a longer period of time. Furthermore, this makes it possible to reduce slime that is present in the reverse osmosis membrane of the reverse osmosis membrane device or inhibit an increase in the slime more favorably, whereby biofouling can also be more favorably inhibited.

As a more preferable aspect, the control part preferably performs the following step 11 and step 21 in parallel at the same time and, furthermore, more preferably performs the following step 12 and step 22 in parallel at the same time. In addition, the control part is capable of preparing water to be treated containing the oxidation-based slime inhibitor and/or the organic-based slime inhibitor while adjusting the addition amounts of the oxidation-based slime inhibitor and the organic-based slime inhibitor to the water to be treated, the addition time or addition period thereof or the like in the first addition step and the second addition step. The control part is capable of supplying the water to be treated containing the oxidation-based slime inhibitor and/or the organic-based slime inhibitor prepared in the first addition step and the second addition step to the reverse osmosis membrane device in the first supply step and the second supply step. The control part is capable of stably operating the water system having the reverse osmosis membrane device over a longer period of time as described above. This makes it possible to inhibit biofouling or the like that occurs in the reverse osmosis membrane device.

As the step 11 in the first step, the control part controls the first chemical addition part to intermittently add the oxidation-based slime inhibitor to the water to be treated in the water system. According to the command from the control part, the first chemical addition part intermittently adds the oxidation-based slime inhibitor to the water to be treated in the water system.

As the step 12 in the first step, the control part controls to, after the addition, intermittently supply the water to be treated containing the oxidation-based slime inhibitor to the reverse osmosis membrane device.

As the step 21 in the second step, the control part controls the second chemical addition part to add the organic-based slime inhibitor at least during the period other than the addition period of the first step. According to the command from the control unit, the second chemical addition part adds the organic-based slime inhibitor at least during "the period other than the addition period of the first step".

As the step 22 in the second step, the control part controls to supply the water to be treated containing the added organic-based slime inhibitor to the reverse osmosis membrane device.

The control part preferably commands the first chemical addition part and the second chemical addition part to adjust the addition concentration (as total chlorine concentration) of the oxidation-based slime inhibitor to be higher than the addition concentration (as chemical mass concentration) of the organic-based slime inhibitor, which makes it possible to add the chemicals as much as desired, respectively.

In addition, the control part preferably commands the first chemical addition part to add the oxidation-based slime inhibitor once or more during three days of the operation period, which makes it possible to last the addition period as long as desired.

In addition, the control part preferably commands to add the oxidation-based slime inhibitor to the first chemical addition part for 0.1 minutes or longer per addition, which makes it possible to last the addition period as long as desired.

As an example, as shown in FIG. 3, the control part (not shown) is capable of controlling a first chemical addition device 10 and a second chemical addition device 20 that are provided in the water system having the reverse osmosis membrane device. The control part is capable of commanding to add the oxidation-based slime inhibitor upstream of the safety filter 3 or the reverse osmosis membrane device 2 to the first chemical addition device 10 along the first step. The control part is capable of commanding to add the organic-based slime inhibitor upstream of the safety filter 3 or the reverse osmosis membrane device 2 to the second chemical addition device 20 along the second step. The control part is capable of supplying the water to be treated containing the oxidation-based slime inhibitor and/or the organic-based slime inhibitor to the reverse osmosis membrane device 2 as described above. The control part controls and performs the first addition step and the second addition step as described above and is thereby capable of stably operating the water system having the reverse osmosis membrane device over a longer period of time as described above.

It is also possible to realize the methods of the present embodiment with devices for performing or managing methods such as the above-described method for operating a reverse osmosis membrane device, slime control method and the like (for example, the methods described in the "1." and "2.") or control parts including the devices (the control part includes CPU, a processor or the like), and it is possible to provide these device or control parts. Examples of the devices for performing or managing the methods include computers, notebook computers, disc top personal computers, tablet PCs, PLCs, servers, cloud services and the like.

Furthermore, the devices or the like for performing or managing the methods may be provided with an input part such as a touch panel or a keyboard, transmission and reception parts or a network between individual parts, a communication part such as a network access part, a display part such as a touch panel or a display or the like as appropriate. This makes it possible to perform the methods of the present embodiment. The devices for performing or managing the methods are capable of including, as the configuration, for example, CPU, RAM, a storage part, a display part, a communication part and the like as appropriate, and, in the configuration, the individual parts may be connected to each other through, for example, a path as a data transmission and reception part as necessary.

In addition, the methods of the present embodiment can also be housed in a hardware resource including a storage medium (a non-volatile memory (USB memory or the like), SSD (solid state drive), HDD (hard disk drive), CD, DVD, Blur-ray disc or the like) as a program and be realized with the above-described control part. The methods of the present embodiment can be provided as a program. It is possible to provide a storage medium storing the methods of the present embodiment. This makes it possible to perform the methods of the present embodiment.

In addition, it is possible to provide a device, a water treatment device, a system, a water-based system or the like for performing the operation, slime control or the like of a reverse osmosis membrane device configured to be capable of operating the reverse osmosis membrane device including the control part, the storage medium, the program or the like or capable of controlling slime in the reverse osmosis membrane device. This makes it possible to perform the methods of the present embodiment. These device, water treatment device, system, water-system system or the like may be configured to be capable of supporting the purpose as appropriate.

In addition, as an example in the present embodiment, it is possible to provide a program that realizes the operation, slime control or the like of a reverse osmosis membrane device including a first function configured to intermittently add an oxidation-based slime inhibitor to a computer to intermittently supply water to be treated containing the oxidation-based slime inhibitor to a reverse osmosis membrane device and a second function configured to add an organic-based slime inhibitor at least during the period other than the addition period of the first step to supply water to be treated containing the organic-based slime inhibitor to the reverse osmosis membrane device, and the present invention is not limited thereto. This makes it possible to perform the methods of the present embodiment.

In the program according to the present embodiment, the description of individual configurations and the like that are duplicate of the configurations in the "1.", "2." and the like, such as the first step, the second step, the oxidation-based slime inhibitor and the organic-based slime inhibitor will be omitted as appropriate, but the description of the "1.", "2." and the like is also true for the present embodiment, and it is possible to appropriately adopt the configuration and the like in the description.

The present technique is capable of adopting the following configurations.

[1] A method for operating a reverse osmosis membrane device, the method having a first step for intermittently adding an oxidation-based slime inhibitor and intermittently supplying water to be treated containing the oxidation-based slime inhibitor to a reverse osmosis membrane device and a second step for adding an organic-based slime inhibitor at least during a period other than the addition period of the first step and supplying the water to be treated containing the organic-based slime inhibitor to the reverse osmosis membrane device.

[2] A slime control method that is applied to a reverse osmosis membrane device, the method having a first step for intermittently adding an oxidation-based slime inhibitor and intermittently supplying water to be treated containing the oxidation-based slime inhibitor to a reverse osmosis membrane device and a second step for adding an organic-based slime inhibitor at least during a period other than the addition period of the first step and supplying the water to be treated containing the organic-based slime inhibitor to the reverse osmosis membrane device.

[3] The method according to [1] or [2], in which an addition concentration of the oxidation-based slime inhibitor is adjusted to be higher than an addition concentration of the organic-based slime inhibitor.

[4] The method according to any one of [1] to [3], in which the oxidation-based slime inhibitor is added once or more during three days of an operation period.

[5] The method according to any one of [1] to [4], in which the oxidation-based slime inhibitor is added for 10 minutes or longer per addition.

[6] The method according to any one of [1] to [5], in which 0.1 mg/L or more of the oxidation-based slime inhibitor is added in terms of a total chlorine concentration.

[7] The method according to any one of [1] to [6], in which 0.01 mg/L or more of the organic-based slime inhibitor is added.

[8] The method according to any one of [1] to [7], in which the oxidation-based slime inhibitor is a combined halogenating agent, preferably one or more selected from a chloramine compound, a stabilized bromide and a halogenated hydantoin compound and more preferably a chloramine compound and/or a stabilized bromide.

[9] The method according to any one of [1] to [8], in which the organic-based slime inhibitor is one or more selected from an isothiazoline compound, a halocyanoacetamide compound, an aldehyde compound and an oxime compound, preferably one or more selected from 2,2-dibromo-3-nitrilopropionamide (DBNPA), 5-chloro-2-methyl-4-isothiazolin-3-one (Cl-MIT), 2-methyl-4-isothiazolin-3-one (MIT) and glutaraldehyde.

[10] A water treatment device or a water treatment water system, in which the method for operating a reverse osmosis membrane device according to any one of [1] and [3] to [9] or the slime control method that is applied to a reverse osmosis membrane device according to any one of [2] to [9] is performed. It is preferable that the water treatment device or the water treatment water system has at least a reverse osmosis membrane device and further has a safety filter device upstream of the reverse osmosis membrane device. In addition, the water treatment device or the water treatment water system preferably has a safety filter device for performing a pretreatment before the supply to the reverse osmosis membrane device, which makes it possible to supply water to be treated that has been treated with a safety filter to the reverse osmosis membrane device.

[11] A water treatment device or a water treatment water system configured to perform the method according to any one of [1] to [9], in which the water treatment device or the water treatment water system may include a control part or a control device, may include CPU in the control part and the control device is preferably a computer device. The water treatment device or the water treatment water system may be a water treatment device or a water treatment water system having the control part or the control device.

[12] A slime control system that is applied to an operation system of a reverse osmosis membrane device or a reverse osmosis membrane device, the slime control system causing a computer to perform the method according to any one of [1] to [9].

[13] A program that causes a computer to perform the method according to any one of [1] to [9].

[14] A program that causes a computer to realize operation of a reverse osmosis membrane device, a computer readable medium housing the program or a device including the program or the medium including a first function that performs a first step for intermittently adding an oxidation-based slime inhibitor and intermittently supplying water to be treated containing the oxidation-based slime inhibitor to a reverse osmosis membrane device and a second function that performs a second step for adding an organic-based slime inhibitor at least during a period other than the addition period of the first step and supplying the water to be treated containing the organic-based slime inhibitor to the reverse osmosis membrane device. A control part, a water treatment device, a control system or a water treatment water system configured to perform the program.

EXAMPLES

Hereinafter, the embodiment of the present disclosure will be described using the following examples and comparative examples. The scope of the present invention is not limited to the examples.

Test Example 1

A substrate was added to raw water, and a biofouling effect of a microorganism was accelerated. Specifically, as substrates, ethanol, ammonium chloride and sodium dihydrogen phosphate were added to raw water so that the concentrations reached 50 mg/L as C, 10 mg/L as N and 0.5 mg/L as P, respectively, thereby producing water to be treated. The pH of the raw water (water to be treated) was 6 to 8, TOC was 1 mg/L, ORP was 300 mV, and the water temperature was 25° C.

This water to be treated was pressurized to 1.5 MPa with a pump and supplied as supply water (the water amount was 100 mL/min, the water pressure was 0.2 MPa, and the water temperature was 25° C.) to a concentrate compartment of an RO membrane device, and an RO membrane treatment was performed. As the RO membrane device, a device in which one vessel was filled with a 4-inch spiral RO membrane element of an aromatic polyamide-based RO membrane (manufactured by Nitto Denko Corporation, ES20) was used. The flow rate of the supply water was 3 to 10 m³/h per 8-inch spiral module. A change in the differential pressure means a change in the difference of the pressure at each water-passing time after the beginning of measurement from 0 kPa that is a set pressure at the time of the beginning of the measurement.

<Method for Evaluating Slime Inhibition in Reverse Osmosis Membrane>

Upon the evaluation of slime inhibition in a reverse osmosis membrane, the number of days taken for the differential pressure to increase up to 100 kPa under conditions shown in Table 1 was measured using a membrane fouling simulator that is in Non-Patent Literature 1 (J. S. Vrouwenvelder et. al.), and the day where this differential pressure was reached was regarded as a day when biofouling occurred, that is, an occlusion day. It is evaluated that, as the number of days taken until this occlusion increases, slime can be inhibited more favorable.

Comparative Example 1-1

No chemical added

Comparative Example 1-2

At 1.5 mg/L as total chlorine concentration (T-Cl) of sodium monochlorosulfamate, this pure chemical was added at all times from day 0 from the beginning until occlusion occurred.

Comparative Example 3

At 0.15 mg/L as Cl-MIT of Cl-MIT, this pure chemical was added at all times from day 0 from the beginning until occlusion occurred.

Example 1-1

A first step of <J1-1> and a second step of <J2-2> were performed together in parallel.

In <J1-1>, at 6 mg/L as T-Cl of sodium monochlorosulfamate, which is an oxidation-based slime inhibitor, the water to be treated was added for two hours from 8 a.m. every day from day 0 from the beginning, and the water to be treated containing the chemical was supplied to the RO membrane device.

In <J2-2>, at 0.15 mg/L as chemical mass concentration (Cl-MIT) of Cl-MIT (5-chloro-2-methyl-4-isothiazolin-3-one), which is an organic-based slime inhibitor, the water to be treated was added at all times from day 0 from the beginning, and the water to be treated containing the chemical was supplied to the RO membrane device. In the case of addition at all times, the addition of the chemical to the water to be treated began from day 0, the chemical was continuously added to the water to be treated with no stop of the addition of the chemical, and the water to be treated containing the chemical was supplied to a reverse osmosis membrane device. Regarding periods during which the addition times of <J1-1> and <J2-2> were duplicate, the water to be contained containing the respective slime inhibitors was supplied to the RO membrane device.

<Preparation of Chemical Containing Sodium Monochlorosulfamate>

A sodium hydroxide aqueous solution was prepared using pure water so that sodium hydroxide (manufactured by Kishida Chemical Co., Ltd.) reached 48 mass %. 19.5 g of this pre-prepared sodium hydroxide aqueous solution and 7.5 g of pure water were mixed together, and then 15.0 g of amidosulfuric acid (sulfamic acid) (manufactured by Kishida Chemical Co., Ltd.) was added to and mixed therewith. After that, 58.0 g of sodium hypochlorite having an effective chlorine concentration of 12 mass % (manufactured by AGC Inc.) was further added thereto and mixed therewith, thereby preparing a monochlorosulfamic acid reagent. The total chlorine concentration of the present chemical is 7 mass % as Cl$_2$.

TABLE 1

| | Test Example 1 | |
|---|---|---|
| | | Number of days until occlusion |
| Comparative Example 1-1 | No chemical added | 8 |
| Comparative Example 1-2 | Sodium monochlorosulfamate Added at all times from day 0 from beginning until occlusion | 12 |
| Comparative Example 1-3 | Cl-MIT Added at all times from day 0 from beginning until occlusion | 15 |
| Example 1-1 | (1) Sodium monochlorosulfamate Chemical is continuously added intermittently from day 0 from beginning until occlusion from 8 a.m. through 10 a.m. every day (for two hours) (chemical addition is stopped from 0 a.m. through 8 a.m. and from 10 a.m through 0 a.m. of next day every day) (2) Cl-MIT Chemical is added at all times from day 0 from beginning until occlusion (continuous addition continues from 0 a.m. through 0 a.m. of next day every day) | 18 |

It was possible to confirm the followings from these water-passing results shown in Table 1.

It was possible to confirm that it is more preferable to add different types of slime inhibitors alternately every several days than to add a single slime inhibitor at all times.

It was possible to confirm that, when a first addition step for intermittently adding the oxidation-based slime inhibitor for two hours once a day and a second addition step for adding the organic-based slime inhibitor at all times were performed in parallel, the number of days until occlusion increased, and the slime inhibition action was superior.

Test Example 2

A test was performed under the same conditions as in <Test Example 1> except that water to be treated prepared by adding, as substrates, IPA and sodium dihydrogen phosphate to raw water so that the concentrations reached 1.4 mg/L as C and 0.02 mg/L as P, respectively, was used, the water temperature of the water to be treated was set and adjusted to 30° C., and the following conditions were adopted as bactericide addition conditions.

Comparative Example 2-1

Cl-MIT, which is an organic-based slime inhibitor, was continuously added at 0.1 mg/L as chemical mass concentration (Cl-MIT), and water was continuously passed through the RO membrane device. Therefore, the water to be treated containing the chemical was continuously passed through an RO membrane device downstream thereof.

Example 2-1

Continuous addition of the organic-based slime inhibitor of the second step for "a certain time" and then continuous addition of the oxidation-based slime inhibitor of the first step during the period during which the addition of the organic-based slime inhibitor of the second step was stopped were repeatedly performed in this order.

Therefore, the oxidation-based slime inhibitor is intermittently added, and the water to be treated containing the oxidation-based slime inhibitor is continuously passed through the reverse osmosis membrane device for "a certain time" On the other hand, the organic-based slime inhibitor is continuously added during "the period other than the addition period of the first step", and the water to be treated containing the organic-based slime inhibitor is continuously passed through the reverse osmosis membrane device during "the period other than the addition period of the first step".

Specifically, Cl-MIT, which was the organic-based slime inhibitor that was used in the second step, was continuously added at 0.1 mg/L as chemical mass concentration (Cl-MIT) for a period of 23.5 hours from 9:30 every day through 9:00 of the next day, water was continuously passed through the RO membrane device downstream thereof during this predetermined period, monochlorosulfanic acid, which was the oxidation-based slime inhibitor that was used in the first step, was continuously added at 5 mg/L as T-Cl for a period of 0.5 hours from 9:00 through 9:30 every day, and water was continuously passed through the RO membrane device downstream thereof during this predetermined period. Therefore, the water to be treated containing the organic-based slime inhibitor, the water to be treated containing the oxidation-based slime inhibitor, the water to be treated containing the organic-based slime inhibitor, . . . are supplied to the reverse osmosis membrane device in this order.

Figure 4:
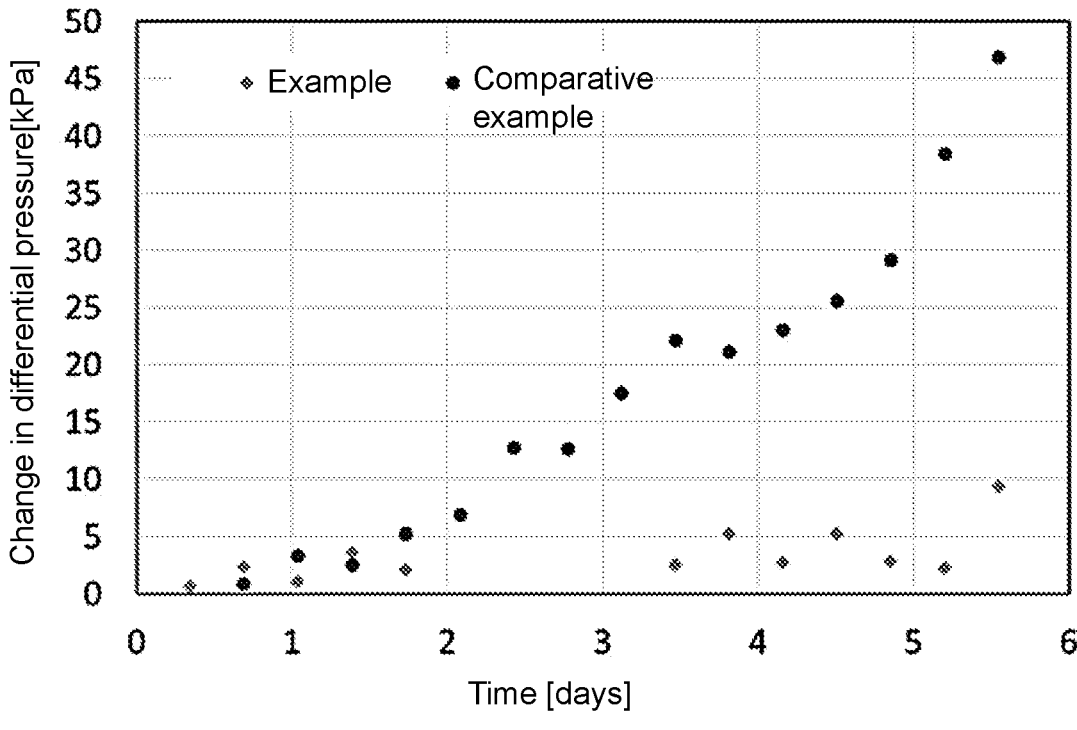
FIG. 4 is a view showing changes (kPa) of differential pressures in Comparative Example 2-1 (●) and Example 2-1 (◆) every water-passing period (day) in Test Example 2.

The results of the changes (kPa) in the differential pressures for up to six days in Example 2-1 and Comparative Example 2-1 are shown in FIG. 4. It is clear that the increase in the differential pressure slowed down in Example 2-1, and thus a result suggesting that the method of Example 2-1 had an extremely excellent slight inhibition function was obtained. Furthermore, in Example 2-1, both the organic-based slime inhibitor and the oxidation-based slime inhibitor were performed at low concentrations, but the changes in the differential pressures were 10 kPa or less even after six days, and thus extremely favorable slime inhibition was obtained, which made it also possible to confirm that both the organic-based slime inhibitor and the oxidation-based slime inhibitor are capable of favorably exhibiting a slime inhibiting function even at low concentrations.

Test Example 3

A test was performed under the same conditions as in <Test Example 1> except that water to be treated prepared by adding, as substrates, ethanol, ammonium chloride and sodium dihydrogen phosphate to raw water so that the concentrations reached 50 mg/L as C, 20 mg/L as N and 1.0 mg/L as P, respectively, was used and the following conditions were adopted as bactericide addition conditions.

Comparative Example 3-1

Cl-MIT, which is an organic-based slime inhibitor, was continuously added at 0.5 mg/L as chemical mass concentration (Cl-MIT), and water was continuously passed through the RO membrane device at all times. Therefore, the water to be treated containing the chemical was continuously passed through an RO membrane device downstream thereof.

Example 3-1

Continuous addition of the organic-based slime inhibitor of the second step "at all times" and continuous addition of the oxidation-based slime inhibitor of the first step "at certain intervals for a certain time" were performed in parallel.

Therefore, the oxidation-based slime inhibitor is intermittently added, and the water to be treated containing the oxidation-based slime inhibitor is continuously passed through the reverse osmosis membrane device for "a certain time" On the other hand, the organic-based slime inhibitor is continuously added "at all times" at least during "the period other than the addition period of the first step", and the water to be treated containing the organic-based slime inhibitor is continuously passed through the reverse osmosis membrane device "at all times". Therefore, the water to be treated containing the organic-based slime inhibitor, the water to be treated jointly containing the oxidation-based slime inhibitor and the organic-based slime inhibitor, the water to be treated containing the organic-based slime inhibitor, are supplied to the reverse osmosis membrane device in this order.

Specifically, Cl-MIT, which is the organic-based slime inhibitor that is used in the second step, was continuously passed through at 0.5 mg/L as chemical mass concentration (Cl-MIT) at all times, and water to be treated containing the chemical was continuously passed through the RO membrane device thereof at all times. In addition, monochlorosulfanic acid, which was the oxidation-based slime inhibitor that was used in the first step, was continuously added at 25 mg/L as T-Cl for a period of one hour from 9:00 through 10:00 every other day, and water to be treated containing the chemical was continuously passed through the RO membrane device downstream thereof during a predetermined period.

Figure 5:
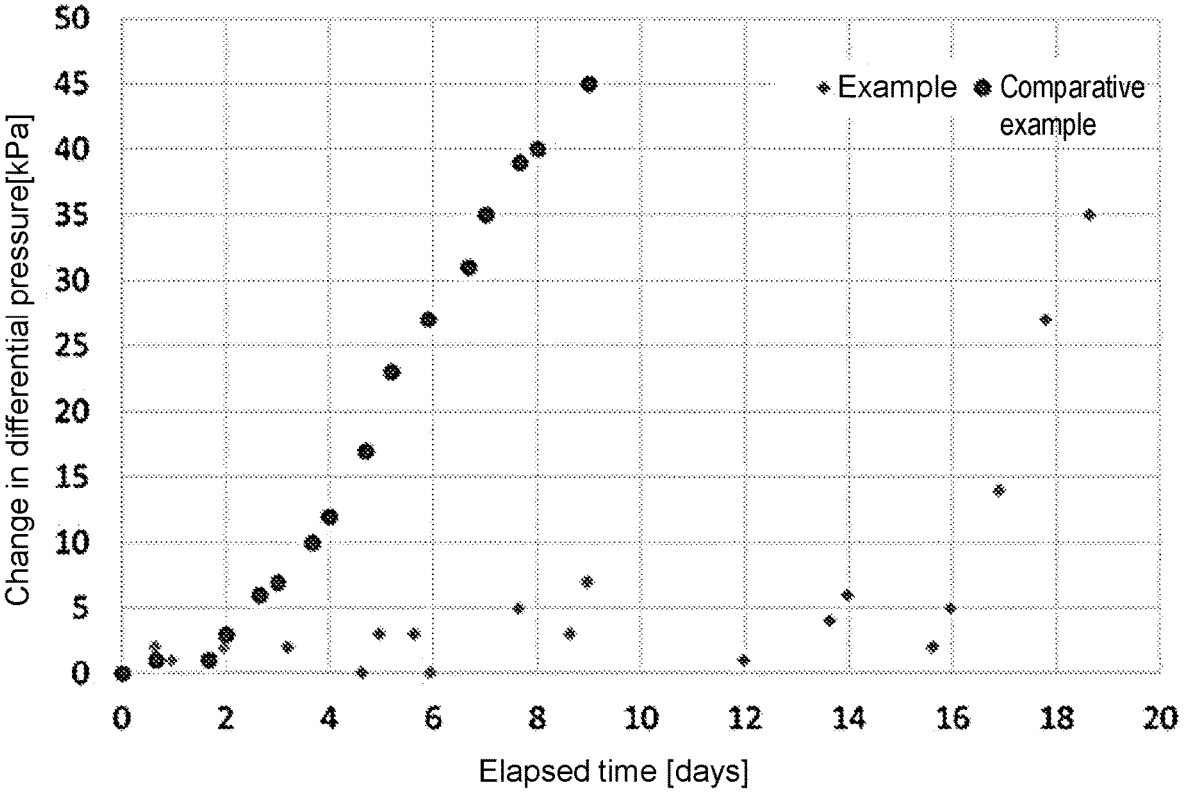
FIG. 5 is a view showing changes (kPa) of differential pressures in Comparative Example 3-1 (●) and Example 3-1 (◆) every water-passing period (day) in Test Example 3.

The results for up to 19 days in Example 3-1 and Comparative Example 3-1 are shown in FIG. 5. It is clear that the increase in the differential pressure slowed down in Example 3-1, and thus a result suggesting that the method of Example 3-1 had an extremely excellent slight inhibition function was obtained. Furthermore, in Example 3-1, the oxidation-based slime inhibitor was performed at a high concentration, but the changes in the differential pressures were 10 kPa or less even after 16 days, and thus extremely favorable slime inhibition was obtained, which made it also possible to confirm that a slime inhibiting function can be favorably exhibited.

Test Example 4

A test was performed under the same conditions as in <Test Example 1> except that water to be treated prepared by adding, as substrates, ethanol, ammonium chloride and sodium dihydrogen phosphate to raw water so that the concentrations reached 30 mg/L as C, 10 mg/L as N and 0.5 mg/L as P, respectively, was used, the water temperature of the water to be treated was set and adjusted to 20° C., and the addition periods and addition concentrations of the slime inhibitors were set as shown in Table 2.

"Intermittent addition (9:00 to 9:30 every day)" in Table 2 indicates that the oxidation-based slime inhibitor was continuously added from 9:00 to 9:30 every day and was not added from 9:30 to 9:00 of the next day. The oxidation-based slime inhibitor is continuously added "for 30 minutes", and the water to be treated containing the chemical is continuously passed through the RO membrane device downstream thereof "for 30 minutes".

"Intermittent addition (21:00 to 21:30 every day)" in Table 2 indicates that the organic-based slime inhibitor was continuously added from 21:00 to 21:30 every day and was not added from 21:30 to 21:00 of the next day. The organic-based slime inhibitor is continuously added "for 30 minutes", and the water to be treated containing the chemical is continuously passed through the RO membrane device downstream thereof "for 30 minutes".

"Addition at all times" in Table 2 indicates that the chemical was continuously added at all times from the beginning of the test through the end of the test. During that period, the chemical is continuously added "at all times", and the water to be treated containing the chemical is continuously passed through the RO membrane device "at all times".

In addition, in Comparative Example 4-6, Comparative Example 4-7 and Example 4-1, as shown in Table 2, the first step and the second step were performed in parallel.

Chemical addition conditions and the number of days necessary for the differential pressure to reach 100 kPa are shown in Table 2 below. As shown in Table 2, a result suggesting that the treatment in which the first addition step for intermittently adding the oxidation-based slime inhibitor and the second addition step for adding the organic-based slime inhibitor at all times were performed in parallel increased the number of days until occlusion and made the slime inhibition action most excellent was obtained.

TABLE 2

| | Test Example 4 | | | | |
| --- | --- | --- | --- | --- | --- |
| | Chemical addition conditions | | | | |
| | Sodium monochlorosulfamate | | Cl-MIT | | |
| | 1 mg/L as T-Cl added at all times | 25 mg/L as T-Cl added intermittently (9:00 to 9:30 every day) | 0.5 mg/L as Cl-MIT added at all times | 13 mg/L as Cl-MIT added intermittently (21:00 to 21:30 every day) | Number of days until occlusion [days] |
| Comparative Example 4-1 | — | — | — | — | 10 |
| Comparative Example 4-2 | ○ | — | — | — | 12 |
| Comparative Example 4-3 | — | ○ | — | — | 30 |

TABLE 2-continued

| | Test Example 4 | | | | |
| | Chemical addition conditions | | | | |
| | Sodium monochlorosulfamate | | Cl-MIT | | |
| | 1 mg/L as T-Cl added at all times | 25 mg/L as T-Cl added intermittently (9:00 to 9:30 every day) | 0.5 mg/L as Cl-MIT added at all times | 13 mg/L as Cl-MIT added intermittently (21:00 to 21:30 every day) | Number of days until occlusion [days] |
|---|---|---|---|---|---|
| Comparative Example 4-4 | — | — | ○ | — | 32 |
| Comparative Example 4-5 | — | — | — | ○ | 18 |
| Comparative Example 4-6 | ○ | — | ○ | — | 36 |
| Comparative Example 4-7 | ○ | — | — | ○ | 22 |
| Example 4-1 | — | ○ | ○ | — | 48 |

○ means that there is RUN (addition).
— means that there is no RUN (no addition).

REFERENCE SIGNS LIST

1 Water system
2 Reverse osmosis membrane device
3 Safety filter
4 Solid-liquid separation device
5 Condensation device
10 First chemical addition device
20 Second chemical addition device

The invention claimed is:

1. A method for operating a reverse osmosis membrane device, the method comprising:
   a first step for intermittently adding an oxidation-based slime inhibitor to water to be treated and intermittently supplying the water to be treated containing the oxidation-based slime inhibitor to a reverse osmosis membrane device; and
   a second step for adding an organic-based slime inhibitor to water to be treated at least during a period other than the addition period of the first step and supplying the water to be treated containing the organic-based slime inhibitor to the reverse osmosis membrane device,
   wherein an addition concentration of the oxidation-based slime inhibitor to water to be treated is adjusted to be higher than an addition concentration of the organic-based slime inhibitor to water to be treated,
   wherein the addition concentration of each addition of the oxidation-based slime inhibitor to water to be treated is 0.1 to 600 mg/L of the water system in terms of total chlorine concentration, wherein the total chlorine concentration is determined in accordance with JIS K 0400-33-10:1999,
   wherein the addition concentration of each addition of the organic-based slime inhibitor to water to be treated is 0.01 to 100 mg (as chemical mass)/L of the water system,
   wherein the first step has a first intermittent addition period per unit and a first addition-free period per unit, and the first intermittent addition period per unit is shorter than the first addition-free period per unit,
   wherein the oxidation-based slime inhibitor is a chemical containing one or more combined halogen compounds selected from chlorosulfamic acid, chlorosulfamate, bromosulfamic acid, and bromosulfamate,
   wherein the organic-based slime inhibitor is selected from one or more of isothiazoline compounds, halocyanoacetamide compounds, aldehyde compounds, or oxime compounds, or a chemical containing one or more compounds selected from these, and
   wherein the water to be treated contains the oxidation-based slime inhibitor or the organic-based slime inhibitor and is separated into concentrated water and permeated water by the reverse osmosis membrane.

2. The method for operating a reverse osmosis membrane device according to claim 1,
   wherein the oxidation-based slime inhibitor is added a total of once or more during three days of an operation period of the reverse osmosis membrane device.

3. The method for operating a reverse osmosis membrane device according to claim 1,
   wherein the oxidation-based slime inhibitor is added for 10 minutes or longer per addition.

4. A slime control method that is applied to a reverse osmosis membrane device, the method comprising:
   a first step for intermittently adding an oxidation-based slime inhibitor to the water to be treated and intermittently supplying the water to be treated containing the oxidation-based slime inhibitor to a reverse osmosis membrane device; and
   a second step for adding an organic-based slime inhibitor to the water to be treated at least during a period other than the addition period of the first step and supplying the water to be treated containing the organic-based slime inhibitor to the reverse osmosis membrane device,
   wherein an addition concentration of the oxidation-based slime inhibitor to water to be treated is adjusted to be higher than an addition concentration of the organic-based slime inhibitor to water to be treated,
   wherein the addition concentration of the oxidation-based slime inhibitor to water to be treated is 0.1 to 600 mg/L of the water system in terms of total chlorine concentration, wherein the total chlorine concentration is determined in accordance with JIS K 0400-33-10:1999, wherein the addition concentration of the organic-based slime inhibitor to water to be treated is 0.01 to 100 mg (as chemical mass)/L of the water system, wherein the first step has a first intermittent addition period per unit and a first addition-free period per unit, and the first intermittent addition period per unit is shorter than the first addition-free period per unit, wherein the oxidation-based slime inhibitor is a chemical containing one or more combined halogen compounds selected from chlorosulfamic acid, chlorosulfamate, bromosulfamic acid, and bromosulfamate, and wherein the organic-based slime inhibitor is selected from one or more of isothiazoline compounds, halocyano-acetamide compounds, aldehyde compounds, or oxime compounds, or a chemical containing one or more compounds selected from these.

* * * * *